US010749372B1

United States Patent
Bica

(10) Patent No.: US 10,749,372 B1
(45) Date of Patent: Aug. 18, 2020

(54) MECHANICAL RENEWABLE GREEN ENERGY PRODUCTION

(71) Applicant: 3B ENERGY, LLC, Brooklyn, NY (US)

(72) Inventor: Victor Bica, Saint James, NY (US)

(73) Assignee: 3B ENERGY, LLC, Brooklyn, NY (US)

( * ) Notice: Subject to any disclaimer, the term of this patent is extended or adjusted under 35 U.S.C. 154(b) by 0 days.

(21) Appl. No.: 16/735,502

(22) Filed: Jan. 6, 2020

Related U.S. Application Data

(60) Provisional application No. 62/929,562, filed on Nov. 1, 2019.

(51) Int. Cl.
| | |
|---|---|
| H02J 7/14 | (2006.01) |
| F03B 7/00 | (2006.01) |
| H02J 7/00 | (2006.01) |
| H02K 7/02 | (2006.01) |
| H02J 3/32 | (2006.01) |

(52) U.S. Cl.
CPC .............. *H02J 7/1415* (2013.01); *F03B 7/00* (2013.01); *H02J 7/007* (2013.01); *H02J 7/0013* (2013.01); *H02J 7/1423* (2013.01); *H02K 7/025* (2013.01); *H02J 3/32* (2013.01); *H02J 7/143* (2020.01)

(58) Field of Classification Search
CPC ............ H02K 7/02–025; H02J 3/28–32; H02J 7/0013–0019; H02J 7/14–30
See application file for complete search history.

(56) References Cited

U.S. PATENT DOCUMENTS

| | | | |
|---|---|---|---|
| 4,677,365 | A | 6/1987 | Yang |
| 5,563,802 | A | 10/1996 | Plahn et al. |
| 6,114,775 | A | 9/2000 | Chung et al. |
| 6,188,139 | B1 | 2/2001 | Thaxton et al. |
| 6,611,068 | B2 | 8/2003 | Cratty |
| 6,803,679 | B1 | 10/2004 | Luo et al. |
| 6,931,856 | B2 | 8/2005 | Belokon et al. |
| 8,039,983 | B2 | 10/2011 | Cote et al. |
| 8,049,358 | B2 | 11/2011 | Crane et al. |
| 8,907,520 | B2 | 12/2014 | Chapel et al. |

(Continued)

*Primary Examiner* — Rexford N Barnie
*Assistant Examiner* — David A Shiao
(74) *Attorney, Agent, or Firm* — Weber Rosselli & Cannon LLP

(57) ABSTRACT

A renewable energy generation system includes a drive motor, a flywheel in mechanical communication with the drive motor, a generator in mechanical communication with the flywheel, a charge controller in electrical communication with the generator, a plurality of charge controller switches in electrical communication with the charge controller, a plurality of batteries in electrical communication with a respective charge controller switch, and a power management module in electrical communication with the plurality of charge controller switches. The drive motor effectuates rotation of the flywheel to generate stored rotational energy which is transferred to the generator as a load is placed upon the generator to maintain a constant speed of the drive motor. The power management module selectively opens or closes a charge controller switch to permit or inhibit the flow of electrical energy to a respective battery to reduce the electrical load placed upon the generator and drive motor.

18 Claims, 16 Drawing Sheets

(56) References Cited

U.S. PATENT DOCUMENTS

| | | |
|---|---|---|
| 9,742,331 B2 | 8/2017 | Liang et al. |
| 9,751,625 B2 | 9/2017 | Phan et al. |
| 10,389,121 B1* | 8/2019 | Sherry ................ H02J 3/02 |
| 2012/0083173 A1 | 4/2012 | McMillan |
| 2012/0280518 A1* | 11/2012 | Woods ............... H02K 11/25 290/40 B |
| 2014/0184153 A1* | 7/2014 | Saint-Leger ........ B60L 58/27 320/108 |
| 2015/0097432 A1* | 4/2015 | Gurin ................. H02P 9/008 307/31 |
| 2015/0188400 A1* | 7/2015 | Kemp ................ H02K 53/00 310/74 |
| 2016/0241029 A1* | 8/2016 | Hodrinsky ............ H02J 1/14 |
| 2016/0352131 A1* | 12/2016 | Nelson ................ B60L 50/52 |
| 2017/0063150 A1* | 3/2017 | Sakamoto ........ H01M 10/425 |
| 2017/0085141 A1* | 3/2017 | Wang ................. H02K 3/12 |
| 2017/0294691 A1* | 10/2017 | Yamamoto ........... H02J 3/32 |
| 2018/0009329 A1* | 1/2018 | Tellez ................. B60L 1/02 |
| 2018/0357577 A1 | 12/2018 | ElBsat et al. |
| 2020/0063706 A1* | 2/2020 | Park .................. F03B 11/00 |

* cited by examiner

MECHANICAL RENEWABLE GREEN ENERGY PRODUCTION

CROSS-REFERENCE TO RELATED APPLICATION

The present application claims the benefit of and priority to U.S. Provisional Patent Application Ser. No. 62/929,562, filed on Nov. 1, 2019, the entire content of which is hereby incorporated by reference herein.

TECHNICAL FIELD

The present disclosure relates generally renewable energy devices, and in particular, mechanical renewable energy generation and storage devices.

BACKGROUND

Renewable energy generation, or green energy generation, has become an increasingly important source of electrical energy generation many countries around the world. As the demand for electrical energy has increased, the availability of fossil fuels has been strained, and the impact of using fossil fuels on the environment has been highlights. In an effort to overcome these obstacles, advancements in green energy generation has continued to accelerate, resulting in innovations such as hydrodynamic generators, wind turbines, geothermal energy, biomass energy, amongst others. However, mechanical energy generation, despite its simplicity, has historically remained rather inefficient. In particular, as a load is placed upon the system, the mechanical device driving electrical generators loses momentum, resulting in a drop in electrical energy generation. To avoid this decrease in electrical energy generation, it is necessary to input additional energy to maintain consistency and therefore, provide consistent electrical energy generation. As can be appreciated, the constant increase or decrease in energy required to maintain constant electrical energy generation using the mechanical device is inefficient and wasteful.

SUMMARY

The present disclosure relates to a renewable energy generation system including a drive motor, a flywheel in mechanical communication with the drive motor, wherein the drive motor effectuates a rotation of the flywheel to generate stored rotation energy, a generator in mechanical communication with the flywheel, wherein the rotational energy of the flywheel is transferred to the generator as a load is placed upon the generator, thereby maintaining a constant speed of the drive motor, a charge controller in electrical communication with the generator, a plurality of charge controller switches in electrical communication with the charge controller, a plurality of batteries, each battery of the plurality of batteries in electrical communication with a respective charge controller switch of the plurality of charge controller switches, and a power management module in electrical communication with the plurality of charge controller switches, the power management module selectively opening or closing one or more of the plurality of charge controller switches to permit or inhibit the flow of electrical energy to respective batteries of the plurality of batteries, thereby reducing the electrical load placed upon the generator, and therefore, the load placed upon the drive motor.

In aspects, the renewable energy generation system may include a plurality of generators, each being in mechanical communication with the flywheel and being in electrical communication with the charge controller.

In certain aspects, the renewable energy generation system may include a plurality of discharge controllers. Each discharge controller of the plurality of discharge controllers is in electrical communication with a respective battery of the plurality of batteries and in electrical communication with the power management module. The power management module selectively opens or closes one or more of the plurality of discharge controller switches to permit or inhibit the flow of electrical energy from respective batteries of the plurality of batteries, thereby reducing the electrical load placed upon the generator, and therefore, the load placed upon the drive motor.

In other aspects, the drive motor may be an electric motor.

In certain aspects, the drive motor may be a pump.

In aspects, the flywheel may be a water wheel. The pump transports the fluid to the water wheel to effectuate rotation of the water wheel.

In other aspects, the drive motor may be a hydraulic motor or a pneumatic motor.

In aspects, the renewable energy generation system may include an electrical control box disposed on an exterior portion of the housing. The electrical control box defines an interior portion in which the charge controller, the plurality of charge controller switches, the plurality of batteries, and the power management module are disposed.

In certain aspects, a rectifier, a diode, and a speed controller are disposed within the electrical control box. The rectifier and the diode are in electrical communication with the generator and the speed controller is in electrical communication with the drive motor.

In aspects, the renewable energy generation system may include a first electrical control box for receiving electrical energy generated by the generator and defining an interior portion in which a speed controller is disposed, the speed controller being in electrical communication with the drive motor, and a second electrical control box in electrical communication with the first electrical control box and defining an interior portion in which a rectifier and a diode are disposed, wherein the rectifier and the diode are in electrical communication with the generator.

In accordance with another aspect of the present disclosure, a method of generating renewable electrical energy includes transmitting rotational energy from a drive motor to a flywheel to store rotational energy into the flywheel, transmitting rotational energy from the flywheel to a generator to generate electrical energy, wherein if an electrical load is placed upon the generator, the rotational energy stored in the flywheel is transferred to the generator to maintain a constant rotational speed of the drive motor, transmitting generated electrical energy from the generator to a charge controller in electrical communication with a plurality of charge controller switches, identifying a battery from a plurality of batteries having a power level greater than a first pre-determined threshold using a power management module in electrical communication with the plurality of charge controller switches, and opening a charge controller switch corresponding to the identified battery to permit the flow of electrical energy to the identified battery, thereby inhibiting a large instantaneous load from being placed upon the generator and drive motor and maintaining the constant rotational speed of the drive motor.

In aspects, the method may include converting alternating current generated by the generator to direct current using a rectifier in electrical communication with the generator to store the direct current electrical energy in the plurality of batteries.

In certain aspects, the method may include converting the direct current received from the plurality of batteries to alternating current using an inverter.

In other aspects, the method may include closing a discharge switch corresponding to the identified battery to inhibit discharging the identified battery.

In certain aspects, the method may include closing a battery bank bypass switch such that the electrical energy generated by the generator bypasses the plurality of batteries and inhibits electrical energy from being transmitted to the plurality of batteries.

In other aspects, the method may include converting a first portion of the direct current electrical energy transmitted from the plurality of batteries to alternating current using a first inverter.

In aspects, the method may include converting a second portion of the direct current electrical energy transmitted from the plurality of batteries to alternating current using a second inverter.

In certain aspects, the first portion of the direct current electrical energy may be converted into alternating current using a pure sign wave inverter.

In other aspects, the second portion of the direct current electrical energy may be converted into alternating current using a grid tie inverter.

In aspects, the method may include monitoring the plurality of generators using a computer module in electrical communication therewith and generating an alarm in response to a fault identified by the computer module.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure, wherein.

DETAILED DESCRIPTION

Figure 1:
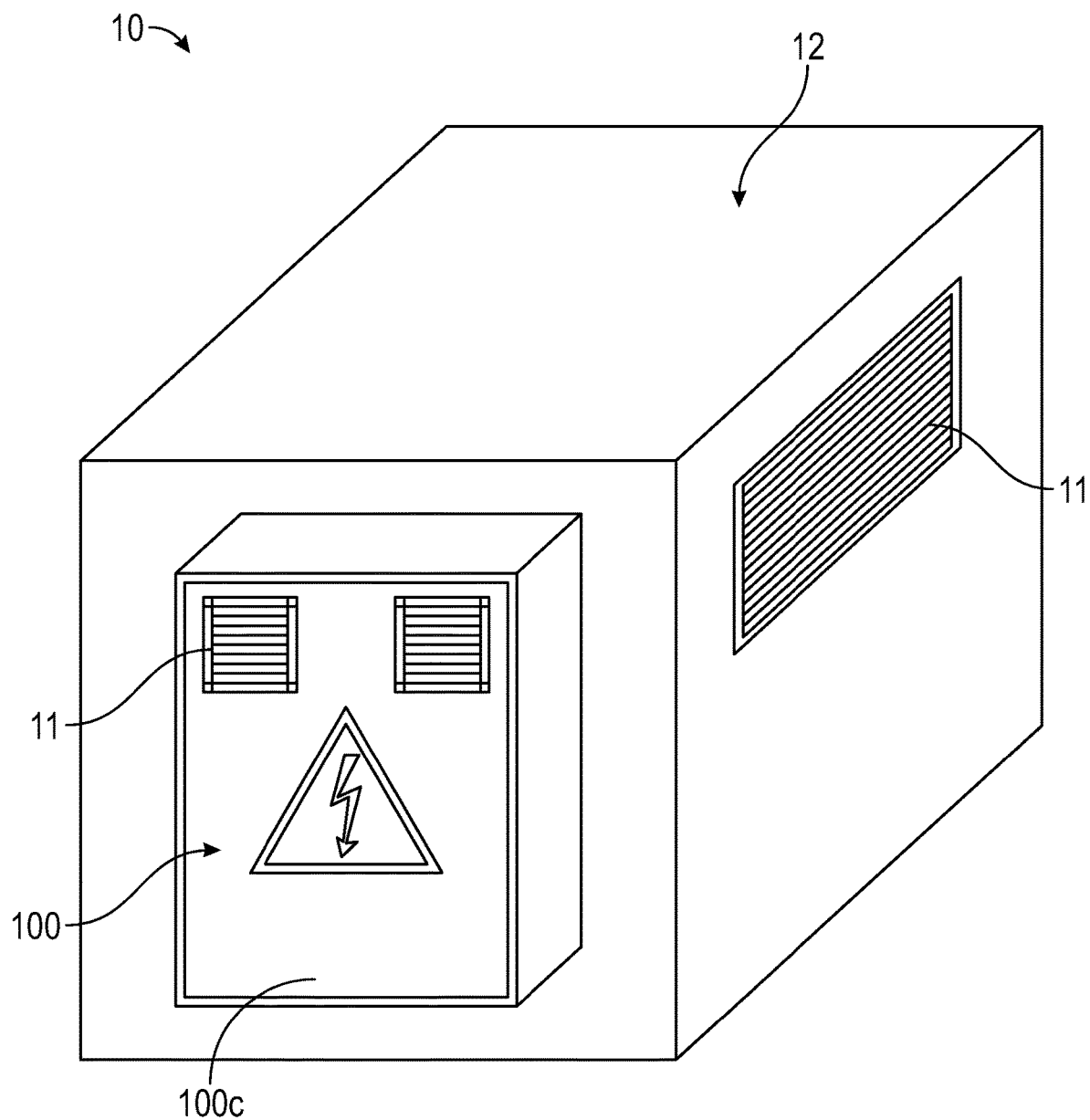
FIG. 1 is a perspective view of a renewable energy generation system provided in accordance with the present disclosure.

The present disclosure is directed to renewable energy generation systems. As described herein, the renewable energy generation system includes a housing and an electrical control box. The housing defines an interior portion housing a drive motor, a plurality of drive gears, a flywheel, a plurality of generator gears, and a plurality of generators. As can be appreciated, the drive motor is in mechanical communication with the flywheel via the plurality of drive gears, such that rotation of an output shaft of the drive motor effectuates a corresponding rotation of the flywheel. It is envisioned that any of the gears described herein may be replaced with a belt and pully configuration. Similarly, the drive motor may be an electric motor, a pump, a hydraulic pump, a pneumatic pump or motor, or the like. In this manner, in the case where the drive motor is an electric motor, a hydraulic pump, or a pneumatic pump the flywheel may be a disc type flywheel. In the case where the drive motor is a pump, the flywheel may be a water wheel, tesla turbine, or the like.

As the flywheel is caused to be rotated, the flywheel stores rotational energy in the form of angular kinetic energy. The higher the rotational speed of the flywheel, the greater the amount of rotational energy is stored by the flywheel. The flywheel is in mechanical communication with the plurality of generators via the plurality of generator gears, such that rotation of the flywheel effectuates a corresponding rotation of the plurality of generators, which in turn, generate electrical energy. As can be appreciated, as load is placed upon the plurality of generators, the load is transferred to the drive motor, thereby causing the drive motor to reduce its rotational speed. To minimize the disruption to the drive motor, and to aid in maintaining a relatively constant rotational speed, the flywheel transfers its stored rotational energy to the plurality of generators to help maintain the rotational speed of both the plurality of generators and the drive motor, thereby reducing the amount of energy required for the renewable energy generation system to generate electrical energy, and increasing the efficiency thereof.

The electrical control box is selectively secured to an outer portion of the housing and defines an interior portion therein housing a computer module, wireless transmitter, a plurality of rectifiers, a plurality of diodes, a plurality of breakers, and a speed controller therein. An alternating current (AC) power source is supplied to the electrical control box which is in electrical communication with the motor speed controller and the computer module, such that the motor speed controller is permitted to monitor and manipulate the speed of the drive motor in response to various loads placed upon the drive motor and/or environmental conditions. The computer module is electrically coupled to the wireless transmitter such that the computer module may be wirelessly connected to a remote computer or user device. In this manner, a user may monitor or otherwise control the renewable energy generation system remotely.

Each of the plurality of generators is electrically coupled to a respective rectifier such that the AC electrical power generated by the plurality of generators is rectified to direct current (DC) electrical power, which is usable by a plurality of batteries. To inhibit electrical power from being returned to the rectifiers (e.g., only permitting flow of electrical energy away from the plurality of rectifiers, and therefore, inhibiting the flow of electrical energy towards the plurality of rectifiers). The DC electrical power is transmitted to a bus, where the DC electrical energy from each of the plurality of generators is combined, and to the computer module, where the voltage level of each of the plurality of generators is monitors. In this manner, the computer monitor identifies faults and generates messages and/or alarms which are wirelessly transmitted by the wireless transmitter to the remote computer and/or user device to alert the user of the fault.

The rectified and combined DC electrical energy is transmitted to a charge controller which monitors and regulates the rate at which DC electrical energy is permitted to be transmitted to, or be drawn by, the plurality of batteries. In the case where a plurality of batteries is utilized, the charge controller is in electrical communication with a plurality of charge controller switches, which enable, or inhibit, DC electrical energy to be transmitted to a respective battery. In this manner, the plurality of charge controller switches are in electrical communication with a power management module, which monitors the plurality of batteries and identifies which batteries have a power level above a minimum value, in which the flow of DC electrical energy is permitted to flow, and which batteries have a power level below a minimum value, in which the flow of DC electrical energy is inhibited from flowing. Additionally, the power management module is in electrical communication with a plurality of discharge controller switches, which in turn, is in electrical communication with the plurality of batteries. The power management module identifies which of the plurality of batteries are in condition to be discharged, or should be inhibited from being discharged. In this manner, the power management module compares the voltage of the plurality of batteries to a minimum value, where the identified battery or plurality of batteries is inhibited from being discharged, and to a maximum value, where the identified battery or plurality of batteries is permitted to be discharged. Power is permitted to flow to the batteries, if the charge controller senses that the power levels are below a set minimum charge level. Power discharges from the batteries, if the charge controller senses that the power levels are above a set maximum charge level. By this process, the renewable energy generation system is permitted to operate without subjecting the renewable energy generation system to instances where the drive motor is subjected to severe electrical loads, maintaining the load placed upon the drive motor as being relatively constant.

The DC electrical energy discharged from the plurality of batteries, and the DC electrical energy transmitted by the battery bank bypass switch in a case where the DC electrical energy from the plurality of generators bypasses the plurality of batteries, is transmitted to a pure sign wave inverter and a grid tie inverter. The pure sign wave inverter is electrically coupled to a local source that may be sensitive to power quality, such as a home, camp, recreational vehicle, etc. and the grid tie inverter is electrically coupled to the electrical grid. In this way, there is no direct load placed on the generators, which enables them to operate at a near constant speed, and improve efficiency for charging the batteries.

In accordance with the present disclosure, a variety of energy sources can be utilized including renewable resources such as solar, wind, and water power to provide the energy to drive the motor. Additionally or alternatively, the motor may be driven by an electrical connection to the public utility AC grid. Renewable options may be preferable for off-grid locations, however, a mixed input may also be employed using a combination of renewable and public utility grid connections. Where access to the public utility grid is available, the charge and discharge controllers may be configured to charge during evening and night hours when public utility rates are less, and discharge during daytime hours where public utilities are under a greater strain in order to prevent local brown outs of the public utility grid. The charge controller may nonetheless enable charging of the batteries during daylight hours, though limiting the input to that from the renewable sources to eliminate additional burden on the utility grid.

Embodiments of the present disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

Referring now to the drawings, a renewable energy generation system is illustrated and generally identified by reference numeral 10. As illustrated in FIGS. 1-8, the renewable energy generation system 10 includes a housing 12 and an electrical control box 100 selectively affixed to an outer portion thereof. The housing 12 and the electrical control box 100 both include ventilation ports 11 defined therein for encouraging airflow into and out of each to enhance cooling of the components disposed therein.

The housing 12 defines an interior portion 12a (FIG. 2) in which a drive motor 14, a plurality of drive gears 16, a flywheel 18, a plurality of generator gears 20 (FIG. 3), and a plurality of generators 22 are disposed. The drive motor 14 is an electric motor having a housing 14a and an output shaft 14b rotatably supported within the housing 14a. The housing 14a is rigidly secured to a portion of the housing 12 such that the housing 14a is inhibited from moving relative to the housing 12. The output shaft 14b is coupled to a drive shaft 24a such that rotation of the output shaft 14b effectuates a corresponding rotation of the drive shaft 24a. As can be appreciated, the output shaft 14b may be fixedly or selectively coupled to the drive shaft 24a using any suitable means, such as welding, adhesives, fasteners (rigid coupling, flexible coupling, etc.), amongst others. It is contemplated that the drive motor 14 may be any suitable electric motor capable of converting electrical energy into rotational energy, such as a brushed motor, a brushless motor, an alternating current (AC) motor, a direct current (DC) motor, etc.

The capacity of the drive motor 14 is selected based upon the anticipated maximum load of the renewable energy generation system 10 (e.g., peak load). As can be appreciated, when a direct load is placed upon the plurality of generators 22, the rotational speed of the drive motor 14 will be reduced. As such, when the drive motor 14 is subjected to a peak load, the drive motor 14 is caused to operate at a minimum rotational speed. However, if the load placed upon the drive motor 14 is kept to a minimum or low level, and load is maintained at a substantially constant level, the drive motor 14 may be effectively controlled to manage the power output transmitted to the plurality of generators 22, as will be described in further detail hereinbelow.

Figure 2:
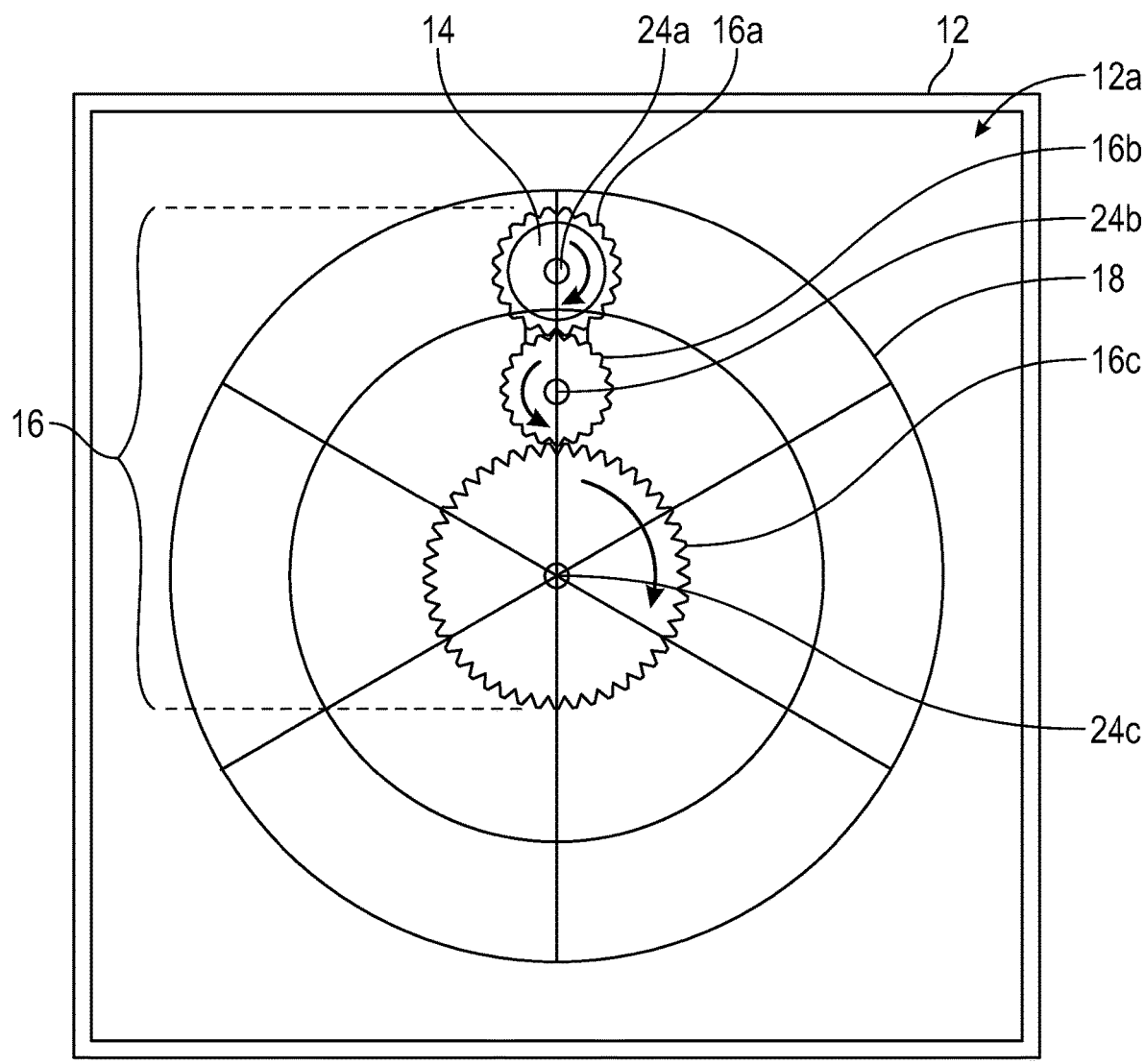
FIG. 2 is a front view of a renewable energy generation device of the renewable energy generation system of FIG. 1.

The plurality of drive gears 16 includes a pinion gear 16a, an idler gear 16b, and a spur gear 16c (FIG. 2). The pinion gear 16a is fixedly coupled (e.g., by welding, fasteners, adhesives, etc.) to the drive shaft 24a such that rotation of the output shaft 14b of the motor 14 effectuates a corresponding rotation of the drive shaft 24a and likewise, a corresponding rotation of the pinion gear 16a. The idler gear 16b is rotatably supported on an idler shaft 24b such that the idler gear 16b is permitted to rotate about the idler shaft 24b. In this manner, the idler shaft 24b is fixedly supported on a portion of the housing 12 using any suitable means, such as welding, adhesives, fasteners, amongst others. The idler gear 16b is meshingly engaged with the pinion gear 16a such that rotation of the pinion gear 16a effectuates a corresponding rotation of the idler gear 16b. The spur gear 16c is fixedly coupled to a flywheel shaft 24c using any suitable means, such as welding, adhesives, fasteners, amongst others. The flywheel shaft 24c is rotatably supported on a portion of the housing 12 by means of a ball bearing, bushing, etc., such that the flywheel shaft 24c is permitted to rotate relative to the housing 12. The spur gear 16a is meshingly engaged with the idler gear 16b such that rotation of the idler gear 16b effectuates a corresponding rotation of the spur gear 16c. It is contemplated that the plurality of drive gears 16 may be formed from any suitable material, such as a metallic material, a polymer, a composite, a ceramic, amongst others, and each of the pinion gear 16a, idler gear 16b, and spur gear 16c may be formed from the same or different materials.

The flywheel 18 is fixedly supported on the flywheel shaft 24c such that rotation of the flywheel shaft 24c effectuates a corresponding rotation of the flywheel 18. As can be appreciated, the flywheel 18 may be fixedly or selectively coupled to the flywheel shaft 24c using any suitable means, such as such as welding, adhesives, fasteners (rigid coupling, flexible coupling, etc.), amongst others. The flywheel 18 defines a generally cylindrical profile and may be formed from any suitable material, such as a metallic material, a polymer, a composite, a ceramic, amongst others. As the flywheel 18 is caused to be rotated, the flywheel 18 stores energy in the form of angular kinetic energy (rotational energy). In this manner, as the flywheel 18 gains rotational speed, the rotational energy of the flywheel 18 increases. As can be appreciated, the overall weight of the flywheel 18, the geometry of the flywheel 18 (outer diameter, thickness (constant or varying), etc.), and the rotational speed of the flywheel 18 cooperate to define the amount of rotational energy the flywheel 18 is able to store. Accordingly, the characteristics of the flywheel 18 can be varied depending upon the requirements of the renewable energy generation system 10. It is contemplated that the flywheel 18 may be disposed in the open air (exposed to the effects of aerodynamic drag) or may be disposed in a vacuum chamber (not shown) to reduce the drag effectuated on the flywheel 18 and therefore reducing the amount of electrical power required to maintain the rotational energy of the flywheel and thereby increasing the efficiency of the renewable energy generation system 10.

As can be appreciated, the rotational energy stored by the flywheel 18 is utilized to reduce the instantaneous load placed upon the drive motor 14 when a load is placed upon one or more of the plurality of generators 22. In this manner, the as a load placed upon the plurality of generators 22 is increased, the rotational energy of the flywheel 18 is transferred to the plurality of generators 22 to help maintain a substantially constant rotational speed of both the plurality of generators 22 and the drive motor 14. It is envisioned that a clutch or other decoupling device (not shown) may be utilized in conjunction with the flywheel 18 to selectively couple and decouple the flywheel 18 from one or both of the plurality of generators 22 or the drive motor 14. By decoupling the flywheel 18 from the drive motor 14 or the plurality of generators 22, the instantaneous load placed upon the drive motor 14 or the plurality of generators 22 can be metered out or more smoothly applied to ensure a relatively constant rotational speed of both the drive motor 14 and the plurality of generators 22.

Figure 4:
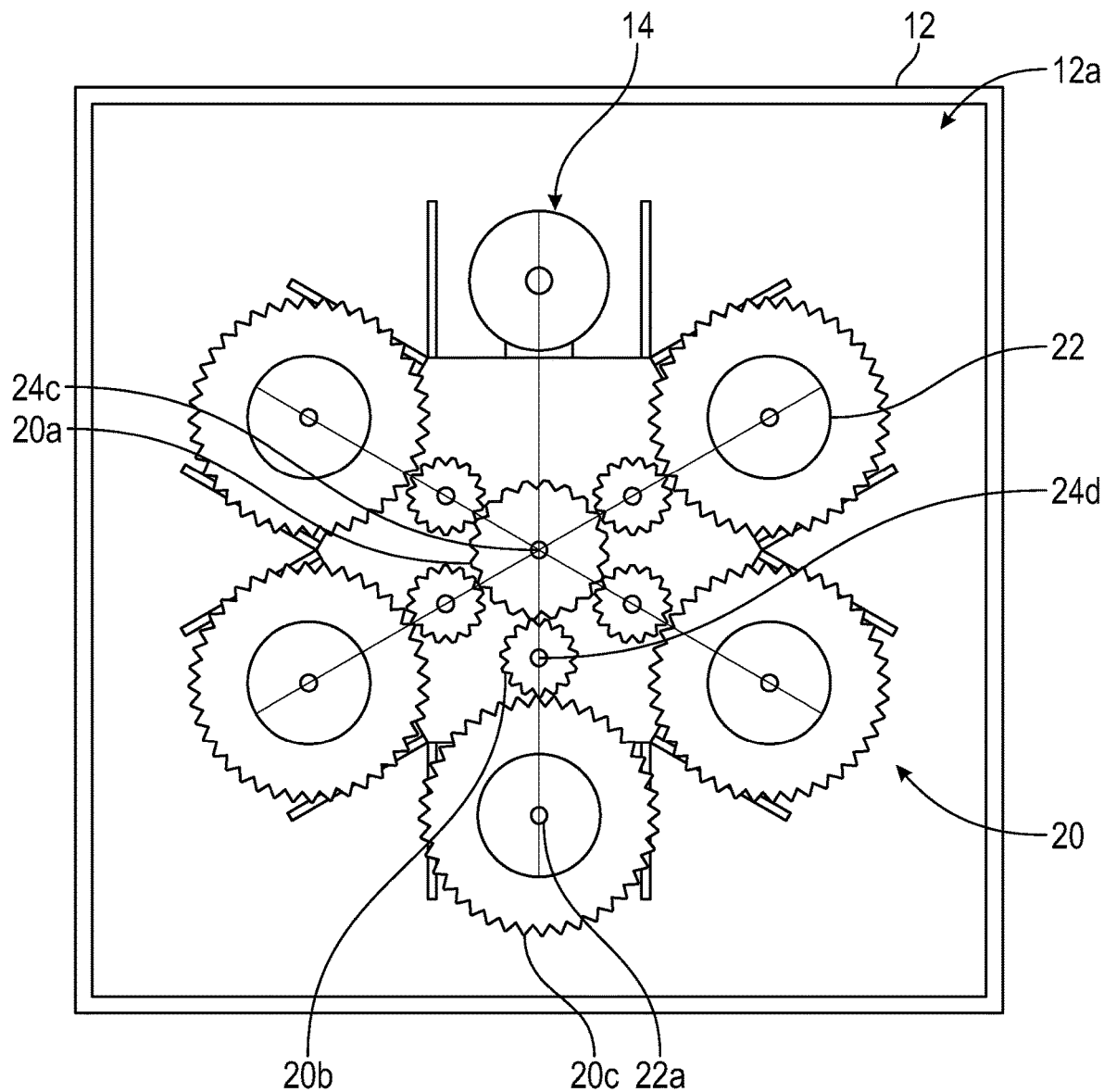
FIG. 4 is a front view of the renewable energy generation device of FIG. 2, showing a gear train coupling a drive motor to generators for the generation of electrical energy.

The plurality of generator gears 20 include a pinion gear 20a, an idler gear 20b, and a spur gear 20c (FIG. 4). As can be appreciated, each generator 22 includes a respective plurality of generator gears, and therefore, only one set of the plurality of generator gears 20 will be described in detail herein in the interest of brevity.

The pinion gear 20a of the plurality of generator gears 20 is fixedly coupled (e.g., by welding, fasteners, adhesives, etc.) to the flywheel shaft 24c such that rotation of the flywheel shaft 24c effectuates a corresponding rotation of the pinion gear 20a. The idler gear 20b is rotatably supported on an idler shaft 24d such that the idler gear 20b is permitted to rotate about the idler shaft 24d. In this manner, the idler shaft 24d is fixedly supported on a portion of the housing 12 using any suitable means, such as welding, adhesives, fasteners, amongst others. The idler gear 20b is meshingly engaged with the pinion gear 20a such that rotation of the pinion gear 20a effectuates a corresponding rotation of the idler gear 20b. The spur gear 20c is fixedly coupled to an output shaft 22a (FIG. 3) of a corresponding generator of the plurality of generators 22 using any suitable means, such as welding, adhesives, fasteners, amongst others. As can be appreciated, rotation of the spur gear 20c effectuates a corresponding rotation of the spur gear 20c, thereby causing the output shaft 22a of the generator 22 to rotate and cause the generation of electrical energy, as will be described in further detail hereinbelow.

Figure 3:
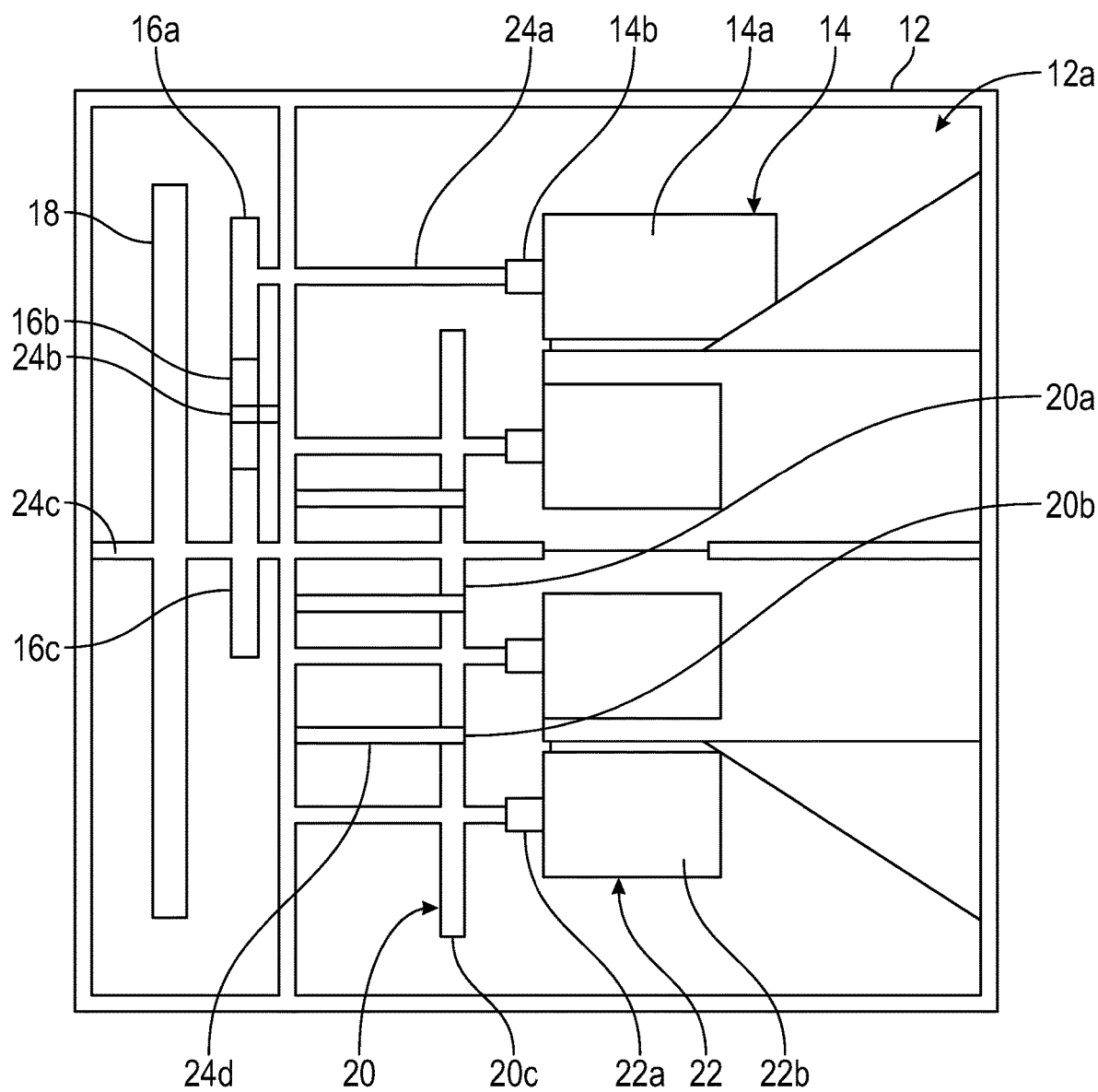
FIG. 3 is a side view of the renewable energy generation device of FIG. 2.

With reference to FIGS. 3 and 4, each generator of the plurality of generators 22 is substantially similar, and therefore, only one generator of the plurality of generators 22 will be described herein in the interest of brevity. The generator 22 is rigidly coupled to a portion of the housing 12 using any suitable means, such as welding, adhesives, fasteners, amongst others. In this manner, the generator 22 includes an outer housing 22b and an output shaft 22a rotatably supported within the outer housing 22b using any suitable means, such as ball bearings, bushings, fluid bearing, etc. Although generally described herein as an induction generator, it is contemplated that the generator 22 may be any suitable generator capable of generating electrical energy may be utilized herein. As can be appreciated, rotation of the output shaft 22a within the housing 22b produces electrical energy, which may be harvested or utilized in any number ways, as will be described in further detail hereinbelow.

It is contemplated that the renewable energy generation system 10 may include one generator 22 or a plurality of generators 22, depending upon the design needs of the system 10. As can be appreciated, for applications requiring a small amount of electrical energy, fewer generators 22 will be utilized and for applications requiring a large amount of electrical energy, more generators 22 will be utilized. In this manner, it is contemplated that the size of the drive motor 14 and/or the plurality of generators 22 may be varied depending upon the required electrical load. It is envisioned that each of the plurality of generators 22 may be the same size or may be different sizes depending upon the required electrical load, such as being sequentially smaller in capacity.

As illustrated in FIG. 4, it is contemplated that the plurality of generators 22 may be arranged in any suitable pattern relative to one another. In this manner, it is envisioned that the plurality of generators 22 may be arranged in a circular pattern about the flywheel shaft 24c, a hexagonal pattern, etc. such that each generator of the plurality of generators 22 is disposed substantially the same distance from one another. As can be appreciated, by spacing the plurality of generators 22 in this manner, the system 10 may be more easily balanced and the design and placement of the plurality of drive gears 16, flywheel 18, and plurality of generator gears 20 may be simplified, reducing the number of required components.

It will be appreciated that for a given installation various gear ratios can be employed to increase or decrease rpm of the various gear driven components as well as power and torque, thus increasing the power and speed of the energy supplied to the generators. These gear ratios may vary from generator to generator as various loads may arise to each generator. In some embodiments with multiple generators, one or more the generators may employ a high gear ratio some a low gear ratio to account for load factors as more generators are added to the system.

Figure 5:
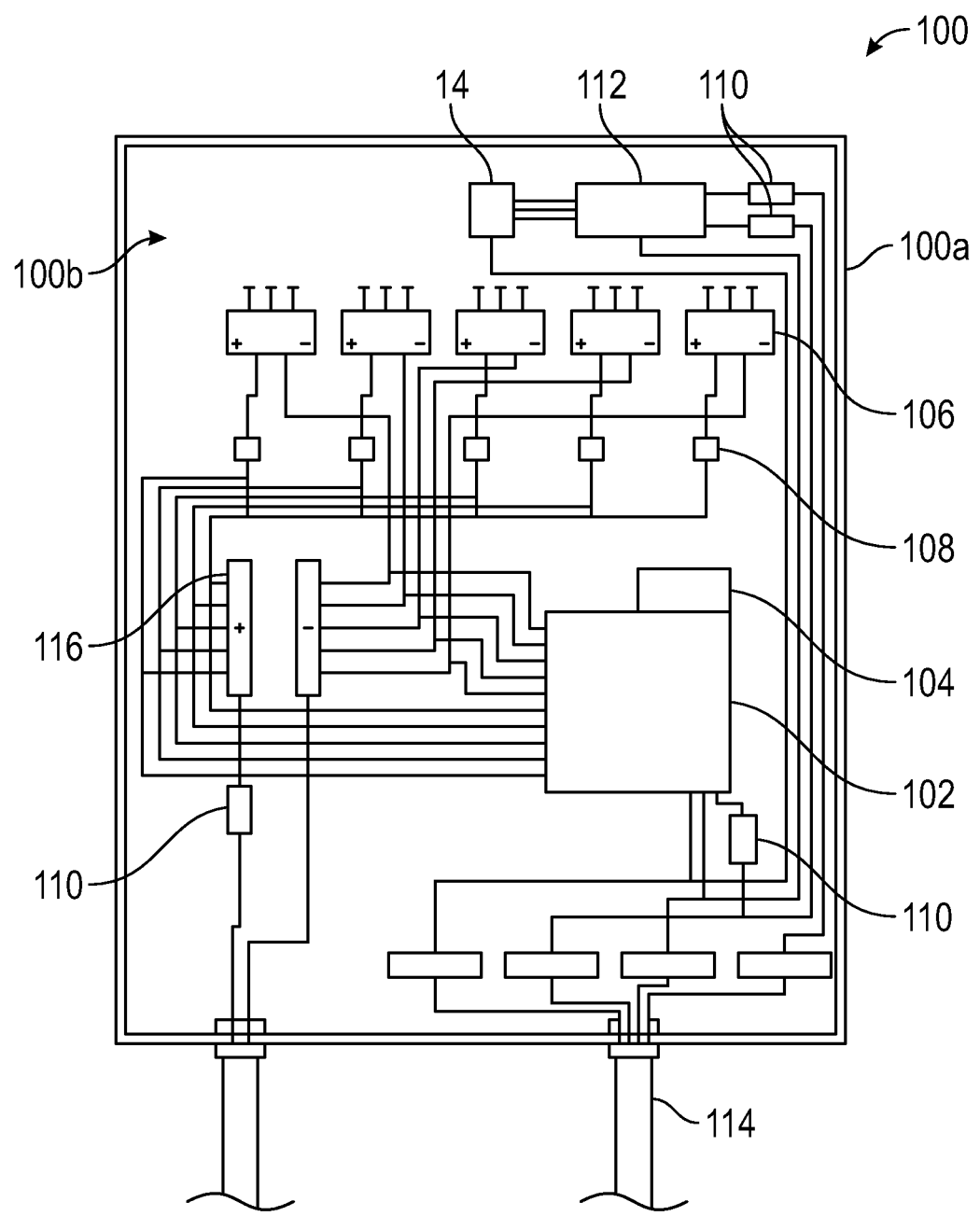
FIG. 5 is a schematic view of an electrical circuit of the renewable energy generation device of FIG. 2 showing AC input power and DC output power.

With reference to FIG. 5, the electrical control box 100 for use with the renewable energy generation system 10 is illustrated. The electrical control box 100 may be any suitable electrical control box capable of being used in either indoor or outdoor locations, depending upon the design needs of the renewable energy generation system 10. The electrical control box 100 includes an outer housing 100a defining an interior portion 100b therein. The outer housing 100a of the electrical control box 100 includes a door 100c (FIG. 1) hingedly coupled to the outer housing 100a such that the interior portion 100b may be accessed. In embodiments, it is contemplated that the door 100c may be removably coupled to a portion or portions of the outer housing 100a.

The electrical control box 100 includes a plurality of electrical components disposed therein and mechanically coupled thereto using any suitable means, such as an electrical sub-plate, DIN-rail, amongst others. As illustrated in FIG. 5, the electrical control box 100 includes a computer module 102, a wireless (WiFi) transmitter 104, a plurality of rectifiers 106, a plurality of diodes 108, a plurality of breakers 110, and a speed controller 112.

An Alternating Current (AC) power source 114 is supplied to the electrical control box 100 from any suitable AC source, such as a generator, AC mains, a service meter, amongst others. The AC power source 114 is in electrical communication with the motor speed controller 112. In this manner, the motor speed controller 112 is in electrical communication with the drive motor 14 such that the motor speed controller 112 is permitted to control the speed of the drive motor 14 in response to various loads placed on the drive motor 14 and/or environmental conditions, as will be described in further detail hereinbelow.

Figure 8:
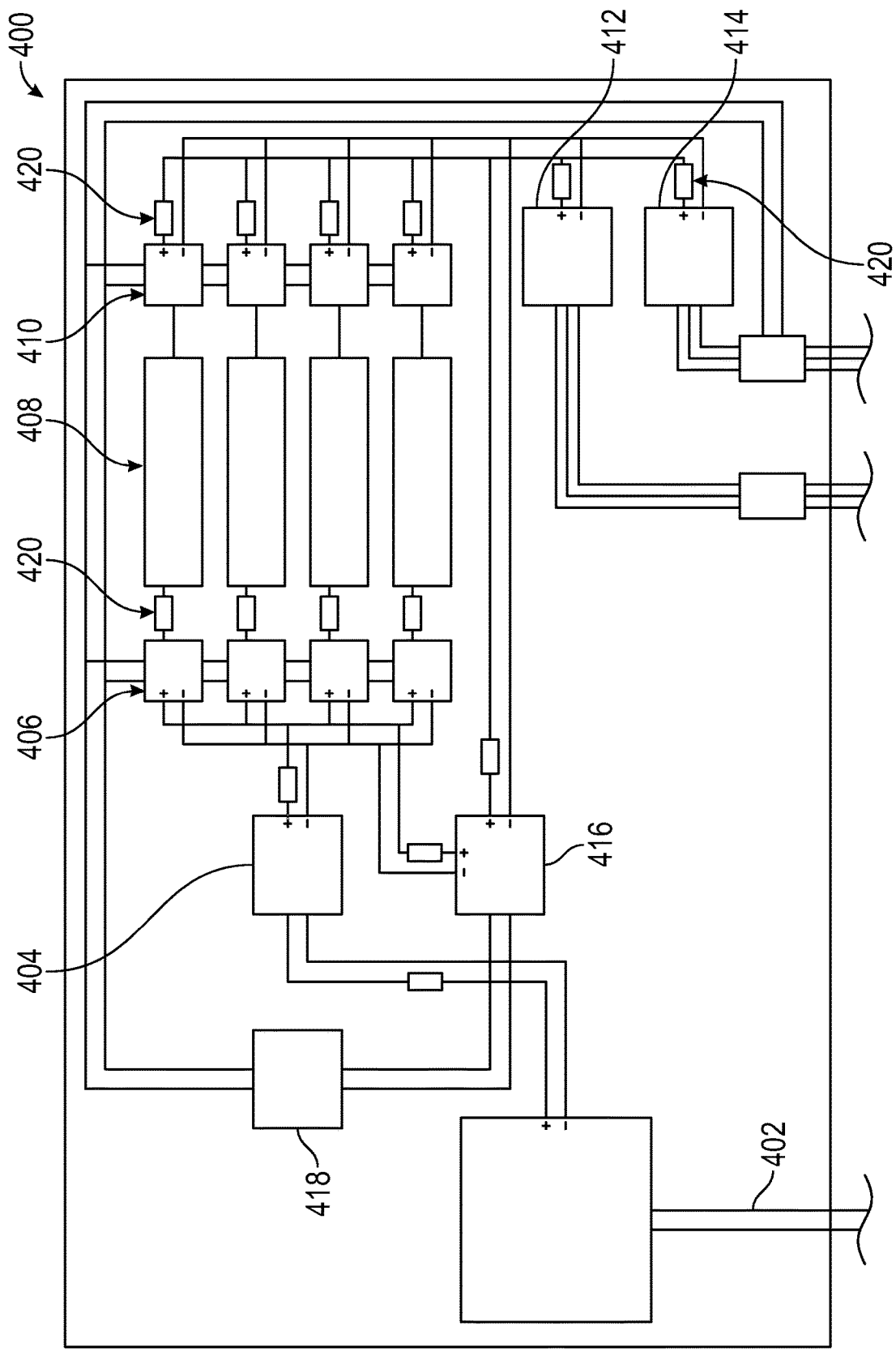
FIG. 8 is a schematic view of an electrical circuit of the renewable energy generation device of FIG. 2 for controlling where the generated energy is transferred

Each generator of the plurality of generators 22 is electrically coupled to a respective rectifier of the plurality of rectifiers 106. In this manner, the alternating current (AC) electrical energy generated by each generator of the plurality of generators 22 is transmitted to each respective rectifier of the plurality of rectifiers 106 such that the electrical energy may be rectified into direct current (DC) electrical energy that is usable by a plurality of batteries 408 (FIG. 8). The positive terminal of each rectifier of the plurality of rectifiers 106 is electrically coupled to a respective diode of the plurality of diodes 108 to inhibit the flow of electrical energy back towards the plurality of rectifiers 106. From the plurality of diodes 108 and the plurality of rectifiers 106, the DC electrical energy is transmitted to both the computer module 102 for monitoring and through an electrical breaker of the plurality of breakers 110 to be transmitted to the plurality of batteries 408. In this manner, the DC electrical energy from each respective generator of the plurality of generators 22 is individually fed to the computer module 102, such that the computer module 102 is permitted to monitor each generator of the plurality of generators 102 for faults, as will be described in further detail hereinbelow. Additionally, the DC electrical energy from each respective generator of the plurality of generators 22 is combined at a bus 116, and thereafter, the combined DC electrical energy is transmitted out of the electrical control box 100 and to the plurality of batteries 408.

Continuing with FIG. 5, the computer module 102 includes a processor (not shown) and a memory (not shown), such as a non-transitory storage medium, that is electrically coupled to the processor. The memory stores a software application and a plurality of voltage thresholds, such that when the software application is executed by the processor, the computer module 102 monitors the voltage levels of each generator of the plurality of generators 22 to identify faults. Specifically, if any the voltage level of a particular generator of the plurality of generators 22 falls below a pre-programmed voltage threshold, the computer module 102 generates an alarm and/or a message to alert a user that a fault exists with that particular generator. It is envisioned that the computer module 102 may generate alarms and/or messages for as many of the plurality of generators 22 that encounter a fault. It is envisioned that the memory can store any number of identifying events for generating alarms and/or messages, depending upon the design needs of the renewable energy generation system 10.

The wireless transmitter 104 may be any suitable wireless transmitter capable of wirelessly transmitting communication data to a remote computer or user device (not shown), such as a WiFi transmitter conforming to IEEE standards or any other suitable wireless protocol. The wireless transmitter 104 is in electrical communication with the computer module 102, such that information pertaining to the operation of the renewable energy generation system 10 that is collected by the processor may be wirelessly transmitted by the wireless transmitter 104 to the remote computer or user device. In this manner, alarms and/or messages generated by the processor of the computer module 102 are wirelessly transmitted by the wireless transmitter 104 and received by the computer or user device to alert a user to a fault in the renewable energy generation system 10.

The wireless transmitter 104 is further utilized to receive instructions from the remote computer or user device (not shown) to wireless control the rotational speed of the drive motor 14. In this manner, the user enters commands in the remote computer or user device which are wireless transmitted to the wireless transmitter 104. The instructions received by the wireless transmitter 104 are transmitted to the computer module 102, which in turn, instructs the speed controller 112 to increase or decrease the rotational speed of the drive motor 14.

Figure 6:
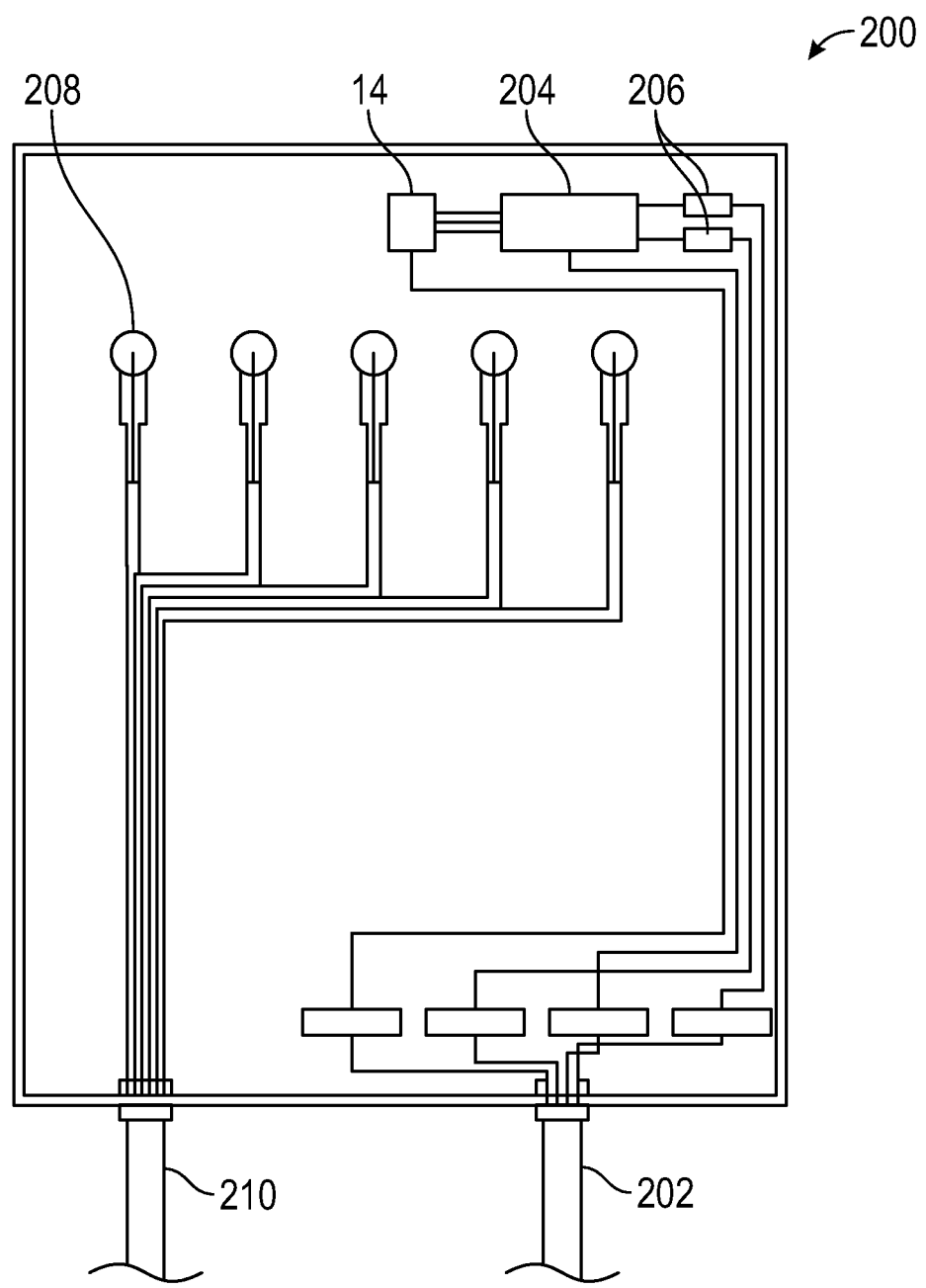
FIG. 6 is a schematic view of another embodiment of an electrical circuit of the renewable energy generation device of FIG. 2 showing AC input and output power.
Figure 7:
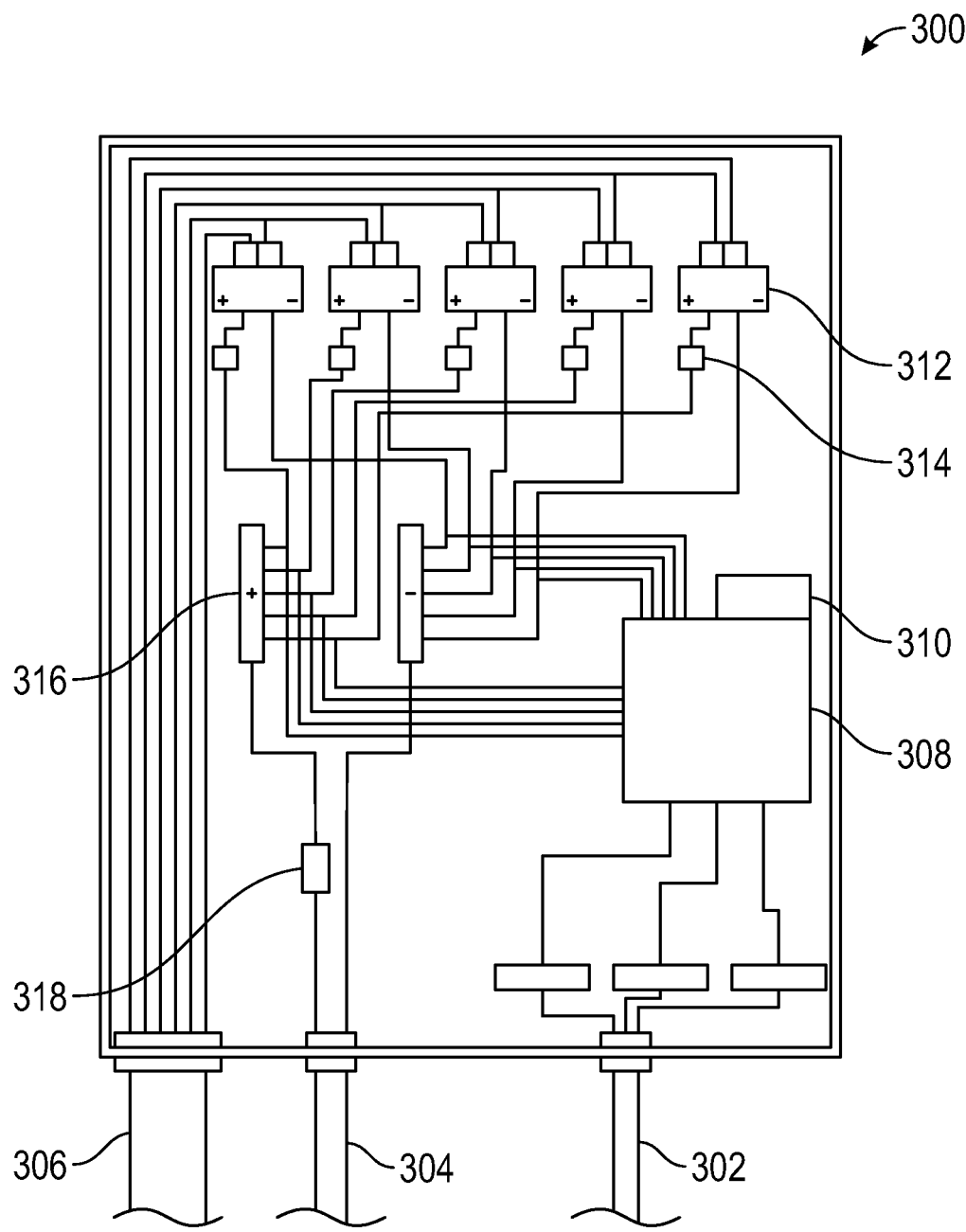
FIG. 7 is a schematic view of yet another embodiment of an electrical circuit of the renewable energy generation device of FIG. 2 showing AC input power, DC output power, and AC power received from the generators of FIG. 4.

As can be appreciated, DC electrical power is not particularly suited for transmission over long distances. Therefore, it is contemplated that the electrical control box 100 is intended for use in situations where the plurality of batteries 408 (FIG. 8) is located a relatively short distance away from the plurality of electrical generators 22. In instances where the electrical energy generated by the plurality of generators 22 is intended to be transmitted over a relatively long distance, such as when the plurality of batteries 408 is located a relatively long distance from the plurality of generators 22, the renewable energy generation system 10 may include two electrical control boxes 200 and 300, splitting the components disposed within the electrical control box 100 therebetween. As illustrated in FIGS. 6 and 7, the renewable energy generation system 10 may include a first electrical control box 200 and a second electrical control box 300. The first electrical control box 200 includes an AC power source 202, a speed controller 204, a plurality of breakers 206, a plurality of generator connectors 208, and an AC outlet 210. The AC power source 202 is supplied to the electrical control box 200 from any suitable AC source, such as a generator, a battery bank, a service meter, amongst others, and is in electrical communication with the speed controller 204, which in turn, is in electrical communication with the drive motor 14. Operation of the speed controller 204 is substantially similar to that of the speed controller 112, and therefore, will not be described in detail herein in the interest of brevity. The plurality of breakers 206 are electrically coupled to the speed controller 204 to protect the speed controller from damage caused by power spikes from the AC source or from situations where the speed controller 204 is caused to draw more power than is permitted by its design.

Each generator connector of the plurality of generator connectors 208 is electrically coupled to a respective generator of the plurality of generators 22 such that AC electrical energy generated by the plurality of generators 22 may be transmitted from the electrical control box 200 to the electrical control box 300 via the AC outlet 210. In this manner, the wires or cables associated with each generator connector of the plurality of generator connectors 208 is kept separate from one another (e.g., not combined on a bus), such that the AC electrical energy associated with each may be individually monitored, as will be described in detail hereinbelow. As can be appreciated, by not rectifying the AC electrical energy generated by the plurality of generators 22, the AC electrical energy is able to be transmitted over a longer distance as compared to DC electrical energy while using a similarly sized AC outlet 210 (e.g., the wire size required to maintain a particular power level is lower than is required by DC electrical energy).

The second electrical control box 300 includes an AC inlet 302, a DC outlet 304, an AC generator power inlet 306, a computer module 308, a wireless (WiFi) transmitter 310, a plurality of rectifiers 312, a plurality of diodes 314, a bus 316 and a breaker 318. An AC power source is supplied to the AC inlet 302 from any suitable AC source, such as a generator, a battery bank, a service meter, amongst others and is in electrical communication with the computer module 308. The computer module 308 and the wireless transmitter 310 are substantially similar to the computer module 102 and the wireless transmitter 104 of the electrical control box 100, and therefore, will not be described in detail herein in the interest of brevity.

The AC generator power inlet 306 is in electrical communication with the AC outlet of the first electrical control box 200, such that the AC electrical energy generated by the plurality of generators 22 is received by the plurality of rectifiers 312. The positive terminal of each of the rectifiers of the plurality of rectifiers 312 is electrically coupled to a respective diode of the plurality of diodes 314 to inhibit the flow of electrical energy back towards the plurality of rectifiers 312. The rectified DC electrical energy from each rectifier of the plurality of rectifiers 312 and each diode of the plurality of diodes 314 is transmitted to both the computer module 308 for monitoring and through the electrical breaker 318 to be transmitted to the plurality of batteries 408. In this manner, the DC electrical energy from each respective generator of the plurality of generators 22 is individually fed to the computer module 308, such that the computer module 308 is permitted to monitor each generator of the plurality of generators 22 for faults. Additionally, the DC electrical energy from each respective generator of the plurality of generators 22 is combined at a bus 316, and thereafter, the combined DC electrical energy is transmitted out of the second electrical control box 300 via the DC outlet 304 and to the plurality of batteries 408.

Turning to FIG. 8, a battery bank control box is illustrated and generally identified as reference number 400. The battery bank control box 400 includes a DC input 402, a charger controller 404, a plurality of charge controller switches 406, a plurality of batteries 408, a plurality of discharge controller switches 410, first inverter 412, a second inverters 414, a battery bank bypass switch 416, a power management module 418, and a plurality of breakers 420.

The DC input 402 is electrically coupled to the DC outlet 304 of the second electrical control box 300 such that the DC electrical energy generated by the plurality of generators 22 is transmitted to the charge controller 404. The charge controller 404 is any suitable charge controller capable of monitoring and regulating the rate at which DC is permitted to transmit to, or be drawn by, the plurality of batteries 408. In this manner, the charge controller 404 inhibits overcharging the plurality of batteries 408 and ensures the plurality of batteries 408 are inhibited from being completely discharged.

Each charge controller switch of the plurality of charge controller switches 406 is in electrical communication with the charge controller 404 at a first portion and in electrical communication with a respective battery of the plurality of batteries 408 at a second portion. Additionally, the power management module 418 is in electrical communication with each charge controller switch of the plurality of charge controller switches 406 and the battery bank bypass switch 416. The power management module 418 controls the operation of the plurality of charge controller switches 406 and the battery bank bypass switch 416. In this manner, the power management module 418 identifies a battery of the plurality of batteries 408 which is not fully charged as well as not being utilized to provide DC electrical power to one of the first or second inverters 412, 414. To identify a battery of the plurality of batteries 408 that is not fully charged, the computer system compares the voltage of each battery of the plurality of batteries 408 to pre-programmed values stored on the memory of the computer system. It is contemplated that the pre-programmed values can be altered depending upon the needs of the renewable energy generation system 10 such as a low voltage value indicative that the battery needs to be charged, and a high voltage value indicative that the battery is near capacity and charging should be terminated. In one non-limiting embodiment, the low voltage value is 20% of battery capacity and the high voltage value is 95% of battery capacity. As can be appreciated, the percentage value of capacity will vary depending upon the type of battery being utilized.

Similarly, discharge controller switches 410 are utilized to identify a battery of the plurality of batteries 408 that are in condition to be discharged or should be inhibited from being discharged. In this manner, the power management module 418 compares the voltage of the plurality of batteries to the pre-programmed values stored on the memory of the computer system. It is contemplated that the power management module 418 may permit discharging of a battery if the identified voltage is greater than (or in embodiments, equal to) 95% capacity of the battery and inhibit discharging of a battery if the identified voltage is less than (or in embodiments, equal to) 20% capacity of the battery. In this manner, the power management module 418 inhibits discharging of a battery if the battery is being charged. As such, the renewable energy generation system 10 is permitted to operate without subjecting the renewable energy generation system 10 to instances where the drive motor is subjected to severe electrical loads, and therefore, enables the drive motor 14 to run more efficiently. In one embodiment, the charge and discharge controllers are so arranged such that the same battery cannot be simultaneously charged and discharged.

The battery bank bypass switch 416 is in electrical communication with the power management module 418 and enables the power management module 418 to switch transmission of electrical power from the plurality of batteries 408 to the first and second inverters 412, 414. In this manner, the DC power received from the electrical control box 100 is permitted to bypass the plurality of batteries 408. As can be appreciated, bypassing the plurality of batteries 408 may be necessary at times where the plurality of batteries 408 are being serviced without interrupting the generation of electrical energy by the plurality of generators 22, during times where use of the plurality of batteries 408 is not required (e.g., during off-peak hours), or when the electrical energy is being transmitted to the electrical grid directly. It is envisioned that utilizing the battery bank bypass switch 416 to bypass the plurality of batteries 408 will vary depending upon the needs of the end user. As can be appreciated, there are situations where a plurality of batteries 408 is not required unless the plurality of batteries is already a part of the end use system, such as camping, recreational vehicles, boating, amongst others (e.g., small scale applications). However, in large scale applications, such as housing, businesses, etc., the use of the plurality of batteries 408 may be used to optimize power consumption during peak and off-peak hours.

The first and second inverters 412, 414 are electrically coupled to the plurality of discharge controller switches 410 and the battery bank bypass switch 416. The first and second inverters 412, 414 convert the DC electrical power supplied by the plurality of batteries 408 or the DC input 402 to AC electrical power than may be utilized either locally or transmitted to the electrical grid. In this manner, the first inverter 412 is in electrical communication with a local power need, such as a house, a business, camping, recreational vehicle, boat, etc. and the second inverter 414 is in electrical communication with the electrical grid. As the local power need is likely to be sensitive to the power quality being supplied thereto (e.g., being appliances, televisions, computers, etc.), it is envisioned that the first inverter 412 may be a pure sign wave inverter. In contrast, since the electrical grid does not require the same level of power quality as the local power need, it is envisioned that the second inverter 414 may be a grid tie inverter. As can be appreciated, the first and second inverters 412, 414, may be the same or different type of inverter, depending upon the design needs of the renewable energy generation system 10.

Although generally described as being a separate enclosure from the second electrical control box 300, it is contemplated that the components of the battery bank control box 400 may be located within the electrical control box 100 or the second electrical control box 300 or the battery bank control box 400 itself may be disposed within the electrical control box 100 or the second electrical control box 300, depending upon the design needs of the renewable energy generation system 10.

In operation, when the renewable energy generation system 10 is idle (e.g., the drive motor 14 is not being driven), a user enters a command on the remote computer or user device to begin generating electrical energy, which in turn, is wireless transmitted and received by the wireless transmitter 104. The computer module 102, in electrical communication with the wireless transmitter 104, commands the speed controller 204 to provide electrical energy to the drive motor 14 and cause the drive motor 14 to begin operating at a target rotational speed, which remains substantially constant. In embodiments, it is contemplated that the computer module 102 automatically identifies when the voltage of one or more of the plurality of batteries 408 falls below the first pre-determined value and causes the speed controller 204 to provide power to the drive motor 14.

The drive motor 14 begins rotating and reaches the target rotational speed, which in turn, effectuates a corresponding rotation of the flywheel 18 to begin storing rotational energy. The rotation of the flywheel 18 effectuates a corresponding rotation of the plurality of generators 22, which begins generating AC electrical energy. The AC electrical energy generated by the plurality of generators is transmitted to the electrical control box 100, and specifically, to the plurality of rectifiers 106 such that the AC electrical energy generated by the plurality of generators 22 is converted to DC electrical energy usable by the plurality of batteries 408.

The DC electrical energy is monitored by the computer module 102 to identify faults within the system, such as if the plurality of generators 22 is not generating electrical energy, generates a message or alarm, and sends the generated message or alarm to the remote computer and/or user device via the wireless transmitter 104. At this point, the user may wirelessly send a command via the remote computer and/or user device to the wireless transmitter 104 to shut-off the drive motor 14 and thereby terminate the generation of electrical energy. Although power is no longer being generated by the plurality of generators 22, power may continue to be drawn from the plurality of batteries 408 during this time. As can be appreciated, the plurality of batteries 408 is concurrently monitored, via the power management module 418, and if faults are identified within one or more of the plurality of batteries 408 or the voltage level of the plurality of batteries falls below the first pre-determined value, the power management module 418 may close the battery bank bypass switch 418 to allows electrical energy generated by the plurality of generators 22 to bypass the plurality of batteries 408 and flow directly to the first and second inverters 412, 414.

The DC electrical energy is transmitted to the charge controller 404, and thereafter, each of the plurality of charge controller switches 406. The power management module 418 identifies which of the plurality of batteries 408 is below the first pre-determined value, above the first-predetermined value, below the second pre-determined value, and/or above the second pre-determined value and opens and/or closes respective charge controller switches 406 to permit or otherwise inhibit charging of respective batteries of the plurality of batteries 408. By monitoring the voltage level of each battery of the plurality of batteries 408, the power management module 418 inhibits large electrical loads from being placed upon the plurality of generators 22, and therefore, the drive motor 14, which permits the drive motor 14 to operate at a substantially constant speed and increases the efficiency of the renewable energy generation system 10.

As demand for electrical energy is placed upon the renewable energy generation system 10, DC electrical energy is drawn from the plurality of batteries 408, which in turn is transmitted to the first and second inverters 412, 414 for converting the DC electrical energy to AC electrical energy. Local power needs, such as a home, business, camp, recreational vehicle, etc. are drawn from the first inverter 412, where the DC electrical energy is converted to AC electrical energy using a pure sign wave inverter, whereas excess electrical energy is drawn from the second inverter 414, which is a grid tie inverter, such that the excess electrical energy is fed back into the electrical grid.

It is contemplated that at any point during the operation of the renewable energy generation system 10, a user may modify or otherwise control the operating parameters of the drive motor 14, plurality of charge controller switches 406, battery bank bypass switch 418, etc. via the remote computer and/or user device. In this manner, the user commands are wirelessly received by the wireless transmitter 104, which in turn are received by the computer module 102, which transmits the user commands to the relevant module and/or component.

Figure 9:
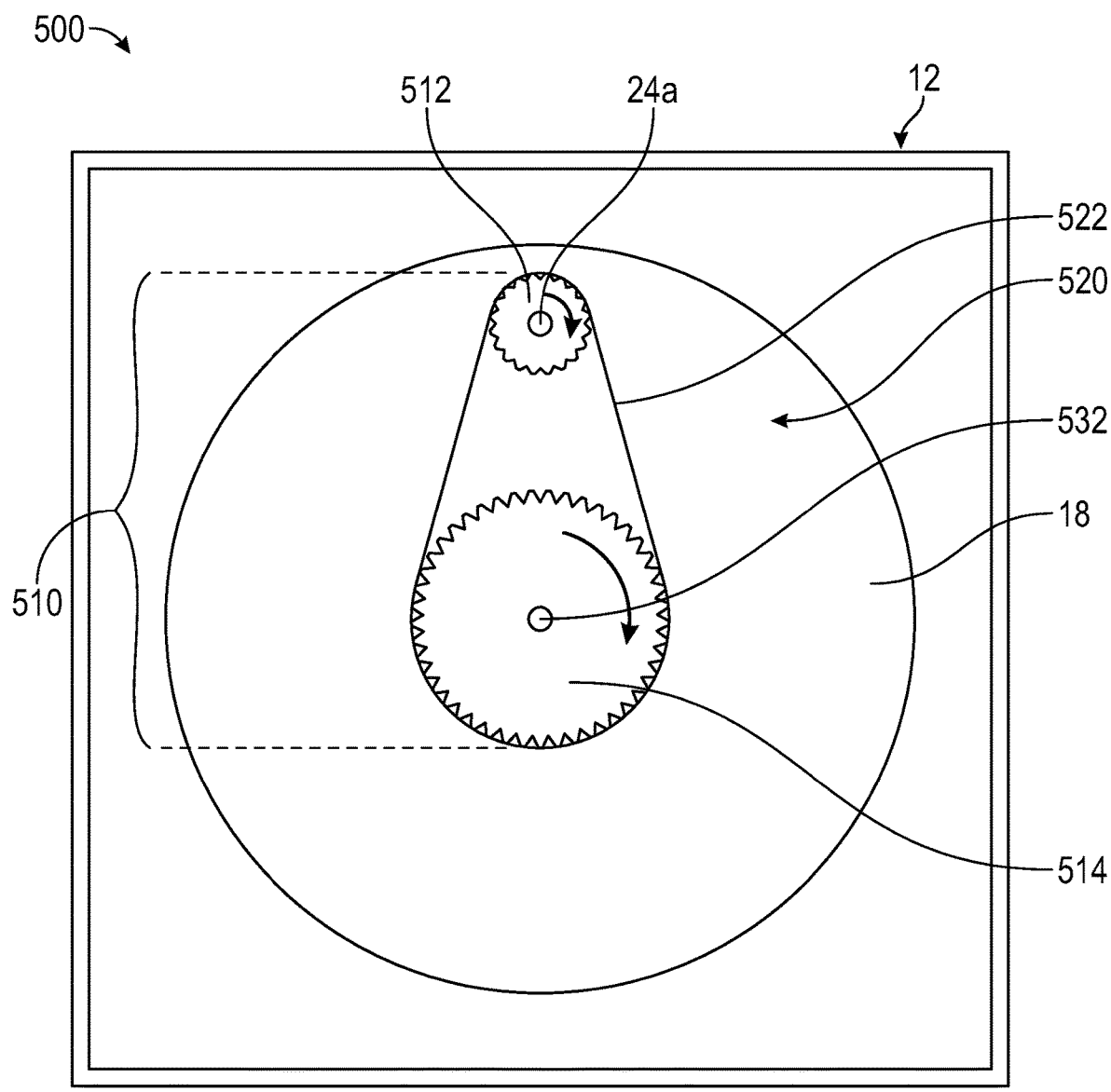
FIG. 9 is a front view of a renewable energy generation device in accordance with another embodiment of the present disclosure.
Figure 10:
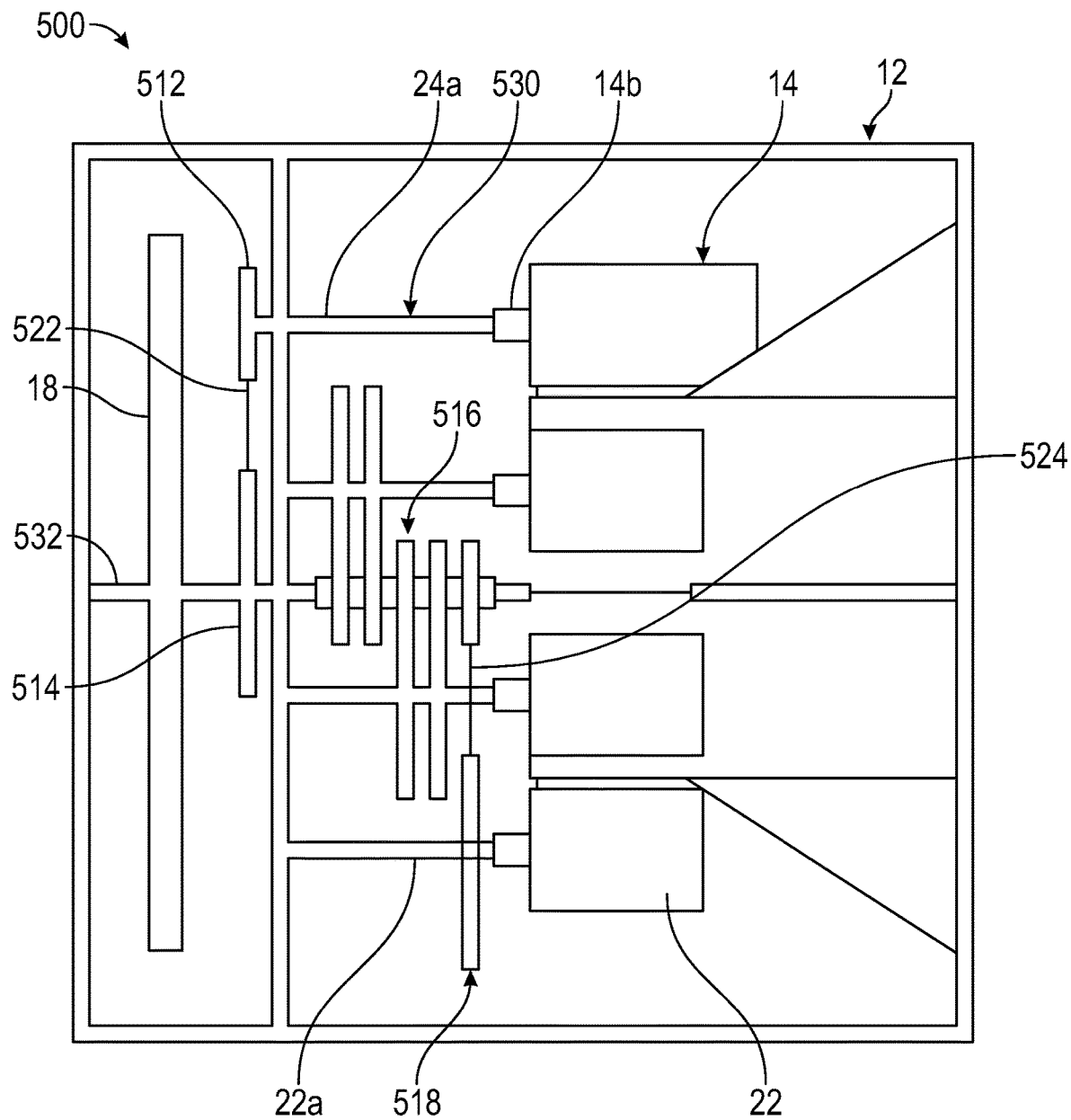
FIG. 10 is a is a side view of the renewable energy generation device of FIG. 9.
Figure 11:
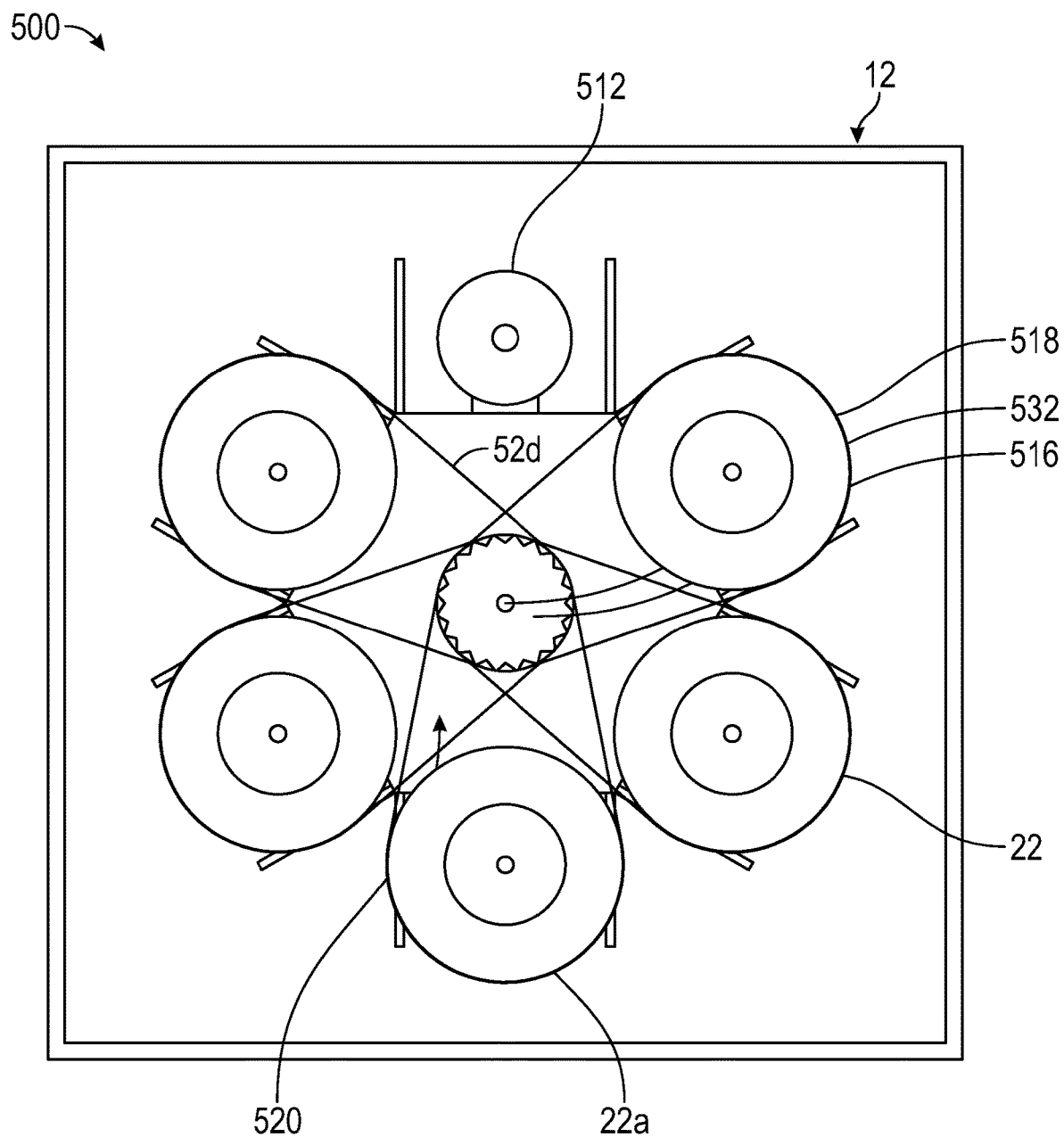
FIG. 11 is a front view of the renewable energy generation device of FIG. 9, showing a pulley system coupling a drive motor to generators for the generation of electrical energy.

With reference to FIGS. 9-11, an alternate embodiment of the renewable energy generation system is illustrated and generally identified by reference numeral 500. The renewable energy generation system 500 is substantially similar to renewable energy generation system 10, and therefore, only the differences therebetween will be described herein in the interest of brevity.

The renewable energy generation system 500 includes a plurality of pulleys 510, a plurality of belts 520, and a plurality of shafts 530. The plurality of pulleys 510 includes a drive pulley 512, a flywheel pulley 514, a plurality of output pulleys 516 (FIG. 10), and a plurality of generator pulleys 518 (FIG. 10). As illustrated in FIG. 10, the drive pulley 512 is fixedly secured to the drive shaft 24a such that rotation of the output shaft 14b of the drive motor 14 effectuates rotation of the drive shaft 24a which effectuates a corresponding rotation of the drive pulley 512. The flywheel pulley 514 is fixedly secured to a flywheel shaft 532 of the plurality of shafts 530. The flywheel shaft 532 is rotatably supported on a portion of the housing 12 by means of a ball bearing, bushing, etc., such that the flywheel shaft 532 is permitted to rotate relative to the housing 12. The drive pulley 512 and the flywheel pulley 514 are in mechanical communication with one another using a drive belt 522 of the plurality of belts 520. It is contemplated that the drive belt 522 may be any suitable type of belt, such as a flat belt, v-belt, etc., or may be a chain or other suitable drive transmission device utilizing pulleys.

The plurality of output pulleys 516 are fixedly secured to the flywheel shaft 532 using any suitable means, such as welding, adhesives, fasteners, amongst others. Each pulley of the plurality of output pulleys 516 is in mechanical communication with a corresponding pulley of the plurality of generator pulleys 518 using a generator belt 524 of the plurality of belts 520. It is contemplated that the generator belt 524 may be any suitable type of belt such as a flat belt, v-belt, etc., or may be a chain or other suitable drive transmission device utilizing pulleys, depending upon the needs of the renewable energy generation system 500. In embodiments, the generator belt 524 may be the same or different than the drive belt 522, and each generator belt 524 may be the same or different depending upon the size of the corresponding generator of the plurality of generators 22.

Each generator pulley of the plurality of generator pulleys 518 is fixedly coupled to the output shaft 22a of a corresponding generator of the plurality of generators 22 using any suitable means, such as welding, adhesives, fasteners, amongst others. As can be appreciated, rotation of the generator pulley 518 effectuates a corresponding rotation of the output shaft 22a of the generator 22 to cause the generation of electrical energy, as will be described in further detail hereinbelow. As illustrated in FIG. 10, each of the output pulleys 516 and each corresponding generator pulley 518 is offset relative to one another along a longitudinal axis defined by the flywheel shaft 532. In this manner, each generator belt 524 is spaced apart from one another to ensure there is no interference therebetween.

Operation of the renewable energy generation system 500 is substantially similar to that of the renewable energy generation system 10, and therefore, a detailed description of the operation of which is not provided in detail herein in the interest of brevity.

Figure 12:
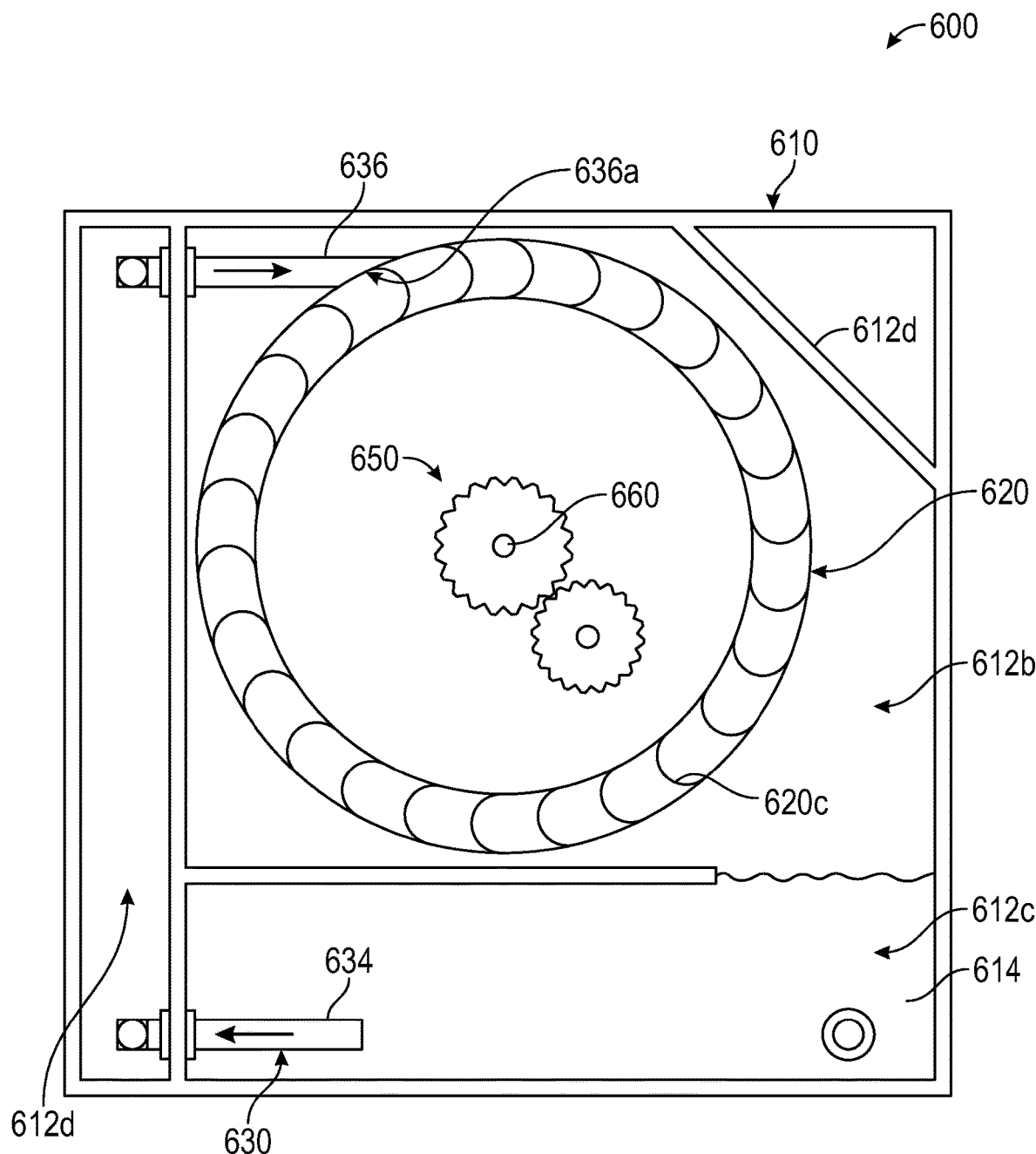
FIG. 12 is a front view of yet another embodiment of a renewable energy generation device provided in accordance with the present disclosure.
Figure 13:
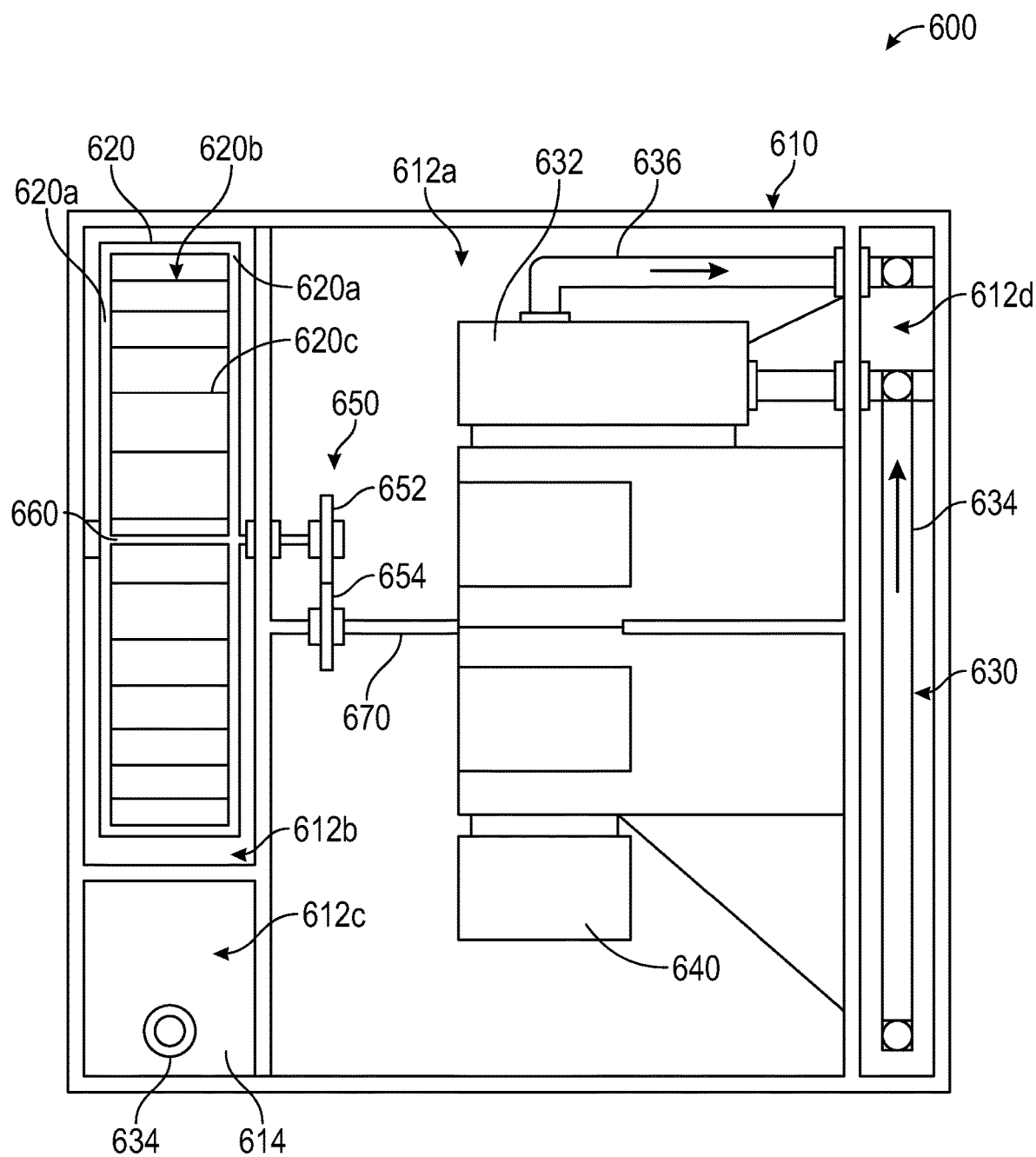
FIG. 13 is a side view of the renewable energy generation device of FIG. 12.
Figure 14:
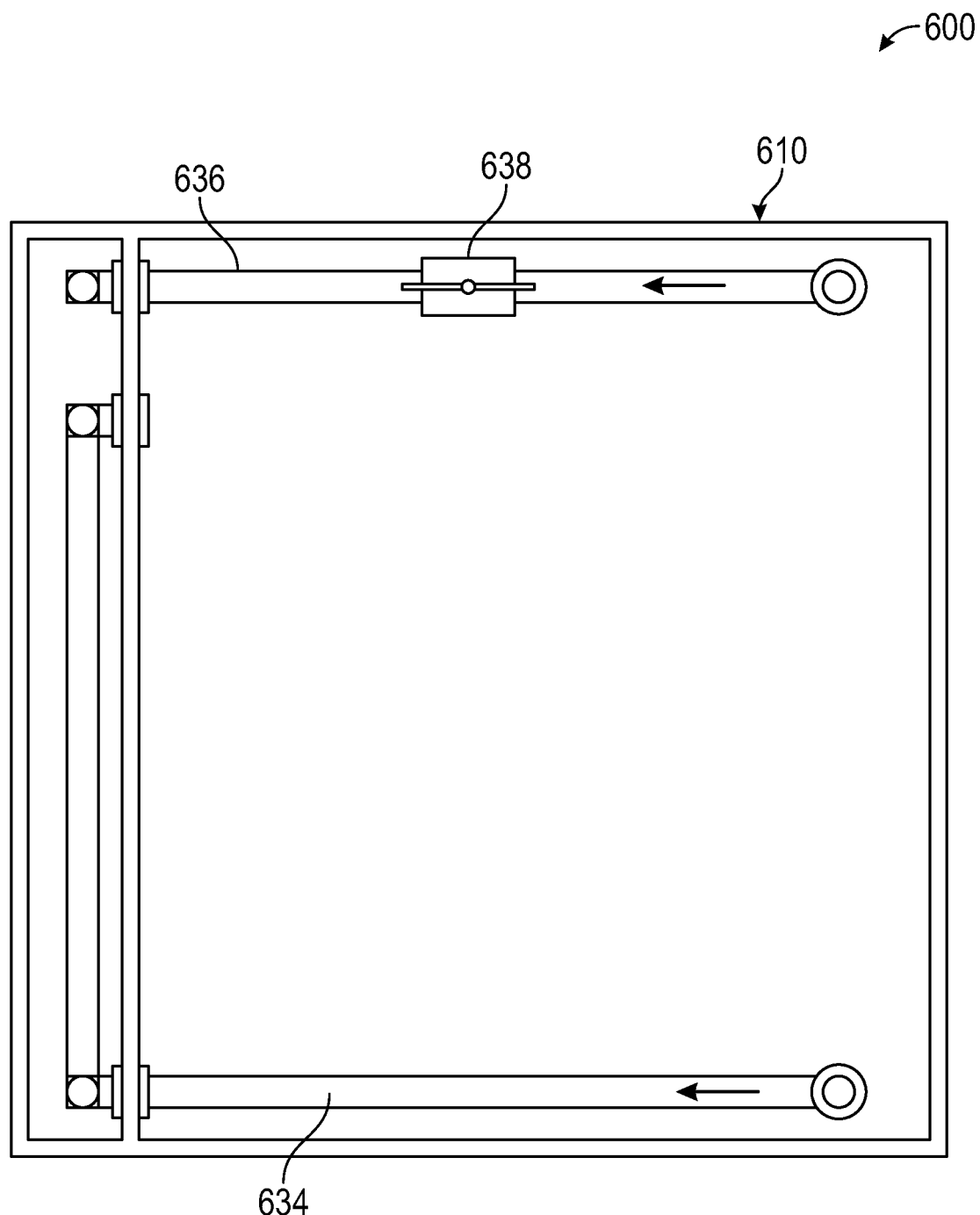
FIG. 14 is a schematic view of a fluid pumping system of the renewable energy generation device of FIG. 13.

With reference to FIGS. 12-14, another embodiment of a renewable energy generation system is illustrated and generally identified by reference numeral 600. The renewable energy generation system 600 includes a housing 610, a water wheel 620, a hydraulic circuit 630, a plurality of generators 640 (FIG. 13), and a gear train 650.

The housing 610 defines an interior portion defining a main compartment 612a at a center portion thereof in which the plurality of generators 640 and the gear train 650 is disposed. The interior portion of the housing 610 defines a water wheel compartment 612b at an end portion thereof for rotatably supporting the water wheel 620 therein. In this manner, the water wheel 620 is fixedly supported on a drive shaft 660 using any suitable means, such as welding, fasteners, adhesives, etc., which in turn is rotatably supported by a portion of the housing 610 using any suitable means, such as ball bearings, fluid bearings, bushings, amongst others. The water wheel 620 includes a generally cylindrical configuration having a pair of spaced apart end plates 620a defining a gap 620b therebetween. A plurality of fins or paddles 620c is disposed within the gap 620b and each fin 620c is fixedly secured to a respective end plate of the pair of end plates 620a on opposite ends thereof such that a fluid impinging on a surface of each fin 620c effectuates rotation of the water wheel 620, as will be described in further detail hereinbelow.

It is contemplated that the plurality of fins 620c may be planar, concave, convex, or any other suitable profile, and may be oriented parallel to a radius extending from a center portion of the water wheel 620 or may be oriented at an angle relative thereto, depending upon the needs of the renewable energy generation system 600. In one non-limiting embodiment, the plurality of fins 620c define a concave or otherwise basket shaped profile and are oriented parallel to a radius of the water wheel 620.

As can be appreciated, the water wheel 620 acts as a flywheel, similar to the flywheel 18 of the renewable energy generation system 10. In this manner, as the water wheel 620 is caused to be rotated, the water wheel 620 stores energy in the form of angular kinetic energy (rotational energy). Accordingly, as the water wheel 620 gains rotational speed, the rotational energy of the water wheel 620 increases. As can be appreciated, the overall weight of the water wheel 620, the geometry of the water wheel 620 (outer diameter, thickness (constant or varying), etc.), and the rotational speed of the water wheel 620 cooperate to define the amount of rotational energy the water wheel 620 is able to store. Accordingly, the characteristics of the water wheel 620 can be varied depending upon the requirements of the renewable energy generation system 600. Although generally described as being a water wheel, it is contemplated that the water wheel 620 may be a tesla turbine utilizing air or other gas transferred thereto by the pump 632 (FIG. 13).

In embodiments, the housing 610 may include a splash guard 612d (FIG. 12) disposed within a portion of the water wheel compartment 612b to deflect or otherwise direct fluid that is ejected from the water wheel 620 towards a holding tank 612c defined at a lower portion of the interior portion 612 of the housing 610. In this manner, the splash guard 612d is oriented at an angle relative to a vertical axis (not shown) defined by the housing 610.

The holding tank 612c defines a volume in which a fluid 614 is disposed. The fluid 614 may be any suitable fluid capable of being transported from the holding tank to an upper portion of the water wheel 620, such as water, oil, gas, etc. In one non-limiting embodiment, the fluid 614 is water. In embodiments, the holding tank 612c is formed from a corrosion resistant material, such as a composite, stainless steel, aluminum, polymer, amongst others. It is contemplated that the holding tank 612c may be formed from a non-corrosion resistant material which is coated with a corrosion resistant coating, such as a metallic material, non-metallic material, ceramic, etc. A portion of the holding tank 612c defines an aperture in which a pipe or other suitable component may be disposed such that the holding tank 612c is in fluid communication therewith.

The interior portion of the housing 610 defines a pipeline compartment 612d in which a portion of the hydraulic circuit 630 is disposed. In this manner, the hydraulic circuit 630 includes a pump 632, an inlet pipe 634, and an outlet pipe 636. Although generally illustrated as being disposed within the main compartment 612a, it is contemplated that the pump 632 may be disposed within the pipeline compartment 612d or within the holding tank 612c. In this manner, the pump 632 may be any suitable pump capable of pumping a fluid, such as a direct lift pump, a displacement pump, a gravity pump, etc. As can be appreciated, the pump 632 may be a submersible pump or a non-submersible pump and may be electrically driven or driven by any suitable means.

The inlet pipe 634 interconnects the holding tank 612c at a first end thereof and an inlet of the pump 632 at a second, opposite end thereof such that the pump 632 is in fluid communication with the holding tank 612c. The outlet pipe 636 is fluidly coupled to an outlet of the pump 632 and transports the fluid 614 to an upper portion of the water wheel compartment 612b, such that the fluid 614 pumped from the pump and through the outlet pipe 636 is ejected from an outlet 636a of the outlet pipe 636 and impinges the fins 620c of the water wheel 620, thereby causing the water wheel 620 to rotate. As can be appreciated, the fluid 614 utilized by the water wheel 620 is collected by the holding tank 612c to help maintain the amount of fluid held by the holding tank 612c. In embodiments, the hydraulic circuit 630 may include a check valve or one-way valve 638 coupled to the outlet pipe 636 to inhibit the flow of fluid back towards the pump 632. It is contemplated that the hydraulic circuit may include a shut-off valve (not shown) or other suitable device capable of inhibiting the flow of fluid through the hydraulic circuit 630. It is envisioned that the shut-off valve may be manually or automatically operated, depending upon the design needs of the hydraulic circuit 630.

With reference to FIG. 13, the drive shaft 660 extends into the main compartment 612a. A pinion gear 652 of the gear train 650 is fixedly coupled to the drive shaft 260 within the main compartment 612a using any suitable means, such as welding, fasteners, adhesives, amongst others. A layshaft 670 is rotatably supported within the main compartment 612a using any suitable means, such as ball bearings, fluid bearings, bushings, etc. and includes a spur gear 654 fixedly coupled thereto by means of welding, fasteners, adhesives, or the like. The spur gear 654 is meshingly engaged with the pinion gear 652 such that rotation of the pinion gear 652 effectuates a corresponding rotation of the spur gear 654, which effectuates a corresponding rotation of the layshaft 670.

The plurality of generators 640 is in mechanical communication with the layshaft 670 using any suitable means. In embodiments, the plurality of generators 640 may be mechanically coupled to the layshaft using a plurality of gears similar to the plurality of generator gears 20 of the renewable energy generation system 10 or the plurality of generator pulleys 518 of the renewable energy generation system 500, and therefore, the means by which rotation of the layshaft 670 is mechanically coupled to the plurality of generators 640 is not described herein in the interest of brevity. Although generally described herein as including a plurality of gears, it is contemplated that the gear train 650 may include a pulley system similar to that of the renewable energy generation system 500. It is further contemplated that the renewable energy generation system 600 may utilize a combination of gears and pulleys, depending upon the design needs thereof.

Operation of the renewable energy generation system 600 is substantially similar to that of the renewable energy generation system 10, except that the speed control 104 operates to control the speed of the pump 632, which in turn, controls the rotational speed of the water wheel 620 to control the generation of electrical energy. Therefore, a further detailed description of the operation of the renewable energy generation system 600 will not be provided herein in the interest of brevity.

Figure 15:
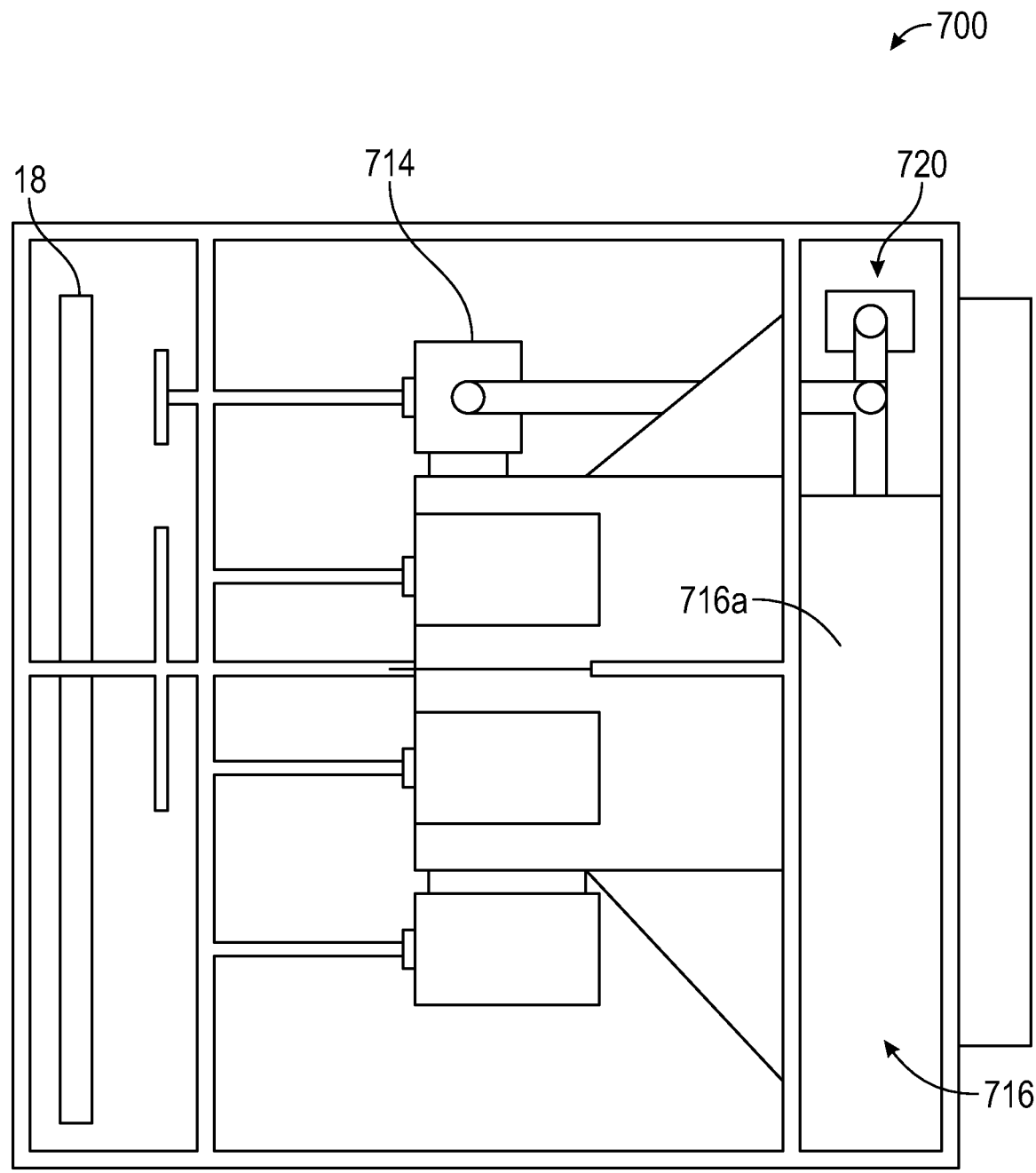
FIG. 15 is a side view of a renewable energy generation device provided in accordance with another embodiment of the present disclosure.
Figure 16:
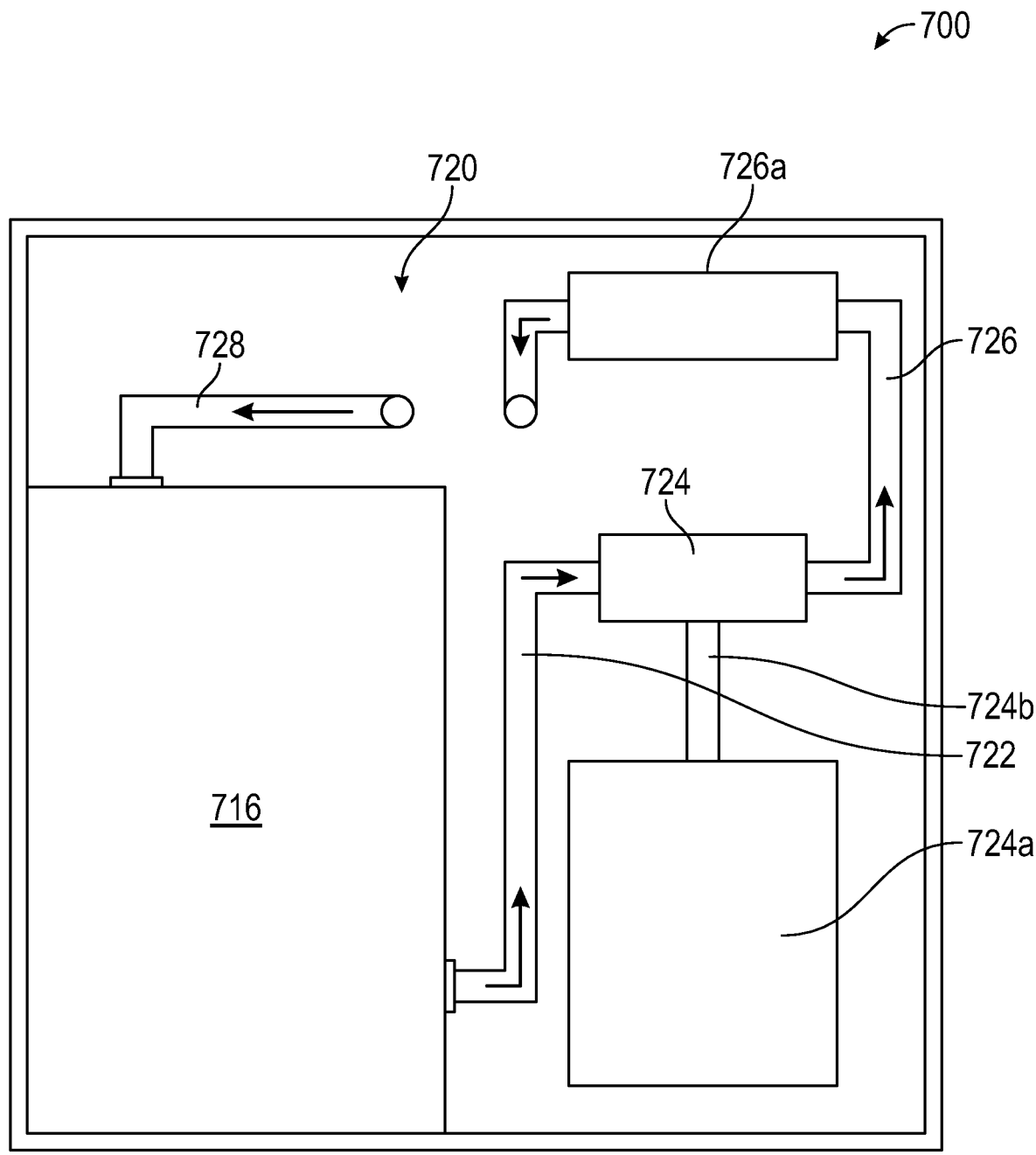
FIG. 16 is a schematic view of a hydraulic or pneumatic circuit of the renewable energy generation device of FIG. 15.

With reference to FIGS. 15 and 16, another embodiment of a renewable energy generation system is illustrated and generally identified by reference numeral 700. The renewable energy generation system 700 is substantially similar to the renewable energy generation system 10, and therefore, only the differences therebetween will be described herein in the interest of brevity.

The renewable energy generation system 700 includes a hydraulic motor 714 in place of the drive motor 14 of the renewable energy generation system 10. It is contemplated that the hydraulic motor 714 may be any suitable hydraulic motor capable of effectuating rotation of the flywheel 718, such as a vane motor, gear motor, gearotor motor, axial plunger motor, radial piston motor, amongst others. Those of ordinary skill in the art will appreciate that the hydraulic motor 714 may alternatively be a pneumatic motor driven by compressed air or another suitable gas to effectuate rotation of the flywheel 718.

The housing 712 of the renewable energy generation system 700 includes a hydraulic fluid holding tank 716 disposed within a portion of the interior portion thereof. In the case of a pneumatic system the holding tank 716 may be a compressed gas cylinder. The hydraulic fluid holding tank 716 defines an interior volume in which a hydraulic fluid 716a is disposed. It is contemplated that the hydraulic fluid may be any suitable hydraulic fluid capable of driving the hydraulic motor 714, such as an oil based hydraulic fluid, a water based hydraulic fluid, etc.

The renewable energy generation system 700 includes a hydraulic system 720 for transporting the hydraulic fluid 716a from the hydraulic fluid holding tank 716, to the hydraulic motor 714, and from the hydraulic motor 714 back to the hydraulic fluid holding tank 716. In the case of a pneumatic system, the gas may either be recaptured or simply released into the atmosphere. As illustrated in FIG. 16, the hydraulic system 720 includes a suction pipe 722 fluidly coupled at a first portion thereof to a lower portion of the hydraulic fluid holding tank 716, although it is contemplated that the suction pipe 722 may be fluidly coupled to any portion of the hydraulic fluid holding tank 716. The suction pipe 722 is fluidly coupled to an inlet of a hydraulic pump 724 at a second portion thereof, such that the hydraulic pump 724 is in fluid communication with the hydraulic fluid holding tank 716. The hydraulic system 720 includes an inlet pipe 726 fluidly coupled to an output of the hydraulic pump 724 at a first portion thereof and is fluid coupled to an inlet of the hydraulic motor 714 at a second, opposite portion thereof. In embodiments, the inlet pipe 726 includes a flow control valve 726a fluidly coupled thereto to control the flow of fluid from the hydraulic pump 724 to the hydraulic motor 714, thereby controlling the speed of the hydraulic motor 714. An outlet pipe 728 is fluidly coupled to an outlet of the hydraulic motor 714 at a first portion thereof and is fluidly coupled to an upper portion of the hydraulic fluid holding tank 716 at a second, opposite portion thereof. In this manner, fluid expelled from the outlet of the hydraulic motor 714 flows through the outlet pipe 728 and is returned to the hydraulic fluid holding tank 716. In the case of a pneumatic motor 714, the hydraulic pump 724 is replaced by compressor used to increase the pressure of the gas in the compressed gas cylinder (i.e., holding tank 716). The compressor is located in fluid communication with the an inlet pipe to the compressed gas cylinder. Although generally described herein as being pipes, it is contemplated that the suction pipe 722, the inlet pipe 726, and the outlet pipe 728 may be any suitable component capable of transporting hydraulic fluid and resisting high pressures, such as a hydraulic hose or the like.

The hydraulic system 720 includes a hydraulic pump drive motor 724a in mechanical communication with the hydraulic pump 724. In this manner, the output shaft of the hydraulic pump drive motor 724a is mechanically coupled to a drive shaft 724b of the hydraulic pump 724 using any suitable means, such as welding, fasteners, adhesives, amongst others. Although generally illustrated as being an electric motor, it is contemplated that the hydraulic pump drive motor 724a may be any suitable device capable of motor capable of driving the hydraulic pump 724. Again, in a pneumatic system, the drive motor 724a can be employed to drive the compressor and increase the pressure of the gas held in the holding tank 716. It is contemplated that the flow control valve 726a and/or the hydraulic pump drive motor 724a may be manually controller or automatically controlled using the remote computer or user device in wireless communication with the wireless transmitter.

Operation of the renewable energy generation system 700 is substantially similar to that of the renewable energy generation system 10 except that the speed controller 104 controls the speed of the hydraulic pump drive motor 724a and the computer module 102 controls the operation of the flow control valve 726a, which in cooperation control the generation of electrical energy. Therefore, a further detailed description of the operation of the renewable energy generation system 700 will not be provided herein in the interest of brevity.

It will be understood that various modifications may be made to the embodiments of the presently disclosed spinal implant. Therefore, the above description should not be construed as limiting, but merely as exemplifications of embodiments. Those skilled in the art will envision other modifications within the scope and spirit of the present disclosure.

What is claimed is:
1. A renewable energy generation system, comprising:
a drive motor;
a flywheel in mechanical communication with the drive motor, wherein the drive motor effectuates a rotation of the flywheel to generate stored rotational energy;
a generator in mechanical communication with the flywheel, wherein the rotational energy of the flywheel is transferred to the generator as a load is placed upon the generator, thereby maintaining a constant speed of the drive motor;
a charge controller in electrical communication with the generator;
a plurality of charge controller switches in electrical communication with the charge controller;
a plurality of discharge controller switches in electrical communication with an electrical load;
a plurality of batteries, each battery of the plurality of batteries in electrical communication with the generator via a respective charge controller switch of the plurality of charge controller switches and in electrical communication with a respective discharge controller switch of the plurality of discharge controller switches; and
a power management module in electrical communication with the plurality of charge controller switches and discharge controller switches, the power management module selectively opening or closing one or more of the plurality of charge controller switches to permit or inhibit the flow of electrical energy to respective batteries of the plurality of batteries to charge one or more of the plurality of batteries, the power management module selectively opening or closing one or more of the plurality of discharge controller switches to supply the electrical load, wherein the power managmenet module prevents closure of a respective charge controller switch of each battery for which a respective discharge controller switch is closed such that the electrical load is decoupled from the generator thereby reducing the electrical load placed upon the generator, and the load placed upon the drive motor.
2. The renewable energy generation system according to claim 1, further comprising a plurality of generators, each generator of the plurality of generators being in mechanical communication with the flywheel and being in electrical communication with the charge controller.

3. The renewable energy generation system according to claim 1, wherein the drive motor is an electric motor.

4. The renewable energy generation system according to claim 1, wherein the drive motor is a pump.

5. The renewable energy generation system according to claim 4, wherein the flywheel is a water wheel, the pump transporting a fluid to the water wheel to effectuate rotation of the water wheel.

6. The renewable energy generation system according to claim 1, wherein the drive motor is a hydraulic motor or a pneumatic motor.

7. The renewable energy generation system according to claim 1, further comprising an electrical control box disposed on an exterior portion of a housing, the electrical control box defining an interior portion in which the charge controller, the plurality of charge controller switches, the plurality of batteries, and the power management module are disposed.

8. The renewable energy generation system according to claim 7, wherein a rectifier, a diode, and a speed controller are disposed within the electrical control box, wherein the rectifier and the diode are in electrical communication with the generator and the speed controller is in electrical communication with the drive motor.

9. The renewable energy generation system according to claim 1, further comprising:
a first electrical control box for receiving electrical energy generated by the generator, the first electrical control box defining an interior portion in which a speed controller is disposed, the speed controller being in electrical communication with the drive motor; and
a second electrical control box in electrical communication with the first electrical control box, the second electrical control box defining an interior portion in which a rectifier and a diode are disposed, wherein the rectifier and the diode are in electrical communication with the generator.

10. A method of generating renewable electrical energy, comprising:
transmitting rotational energy from a drive motor to a flywheel to store rotational energy in the flywheel;
transmitting rotational energy from the flywheel to a generator to generate electrical energy, wherein if an electrical load is placed upon the generator, the rotational energy stored in the flywheel is transferred to the generator to maintain a constant rotational speed of the drive motor;
transmitting generated electrical energy from the generator to a charge controller in electrical communication with a plurality of charge controller switches;
transmitting generated electrical energy from a plurality of batteries to the electrical load via a plurality of discharge controller switches;
identifying a battery from the plurality of batteries having a charge level greater than a first pre-determined threshold using a power management module in electrical communication with the plurality of charge controller switches; and
opening a charge controller switch corresponding to the identified battery to inhibit the flow of electrical energy to the identified battery,
closing a discharge controller switch corresponding to the identified battery to supply power to the electrical load, wherein the power management module prevents closure of a respective discharge controller switch of each battery for which the charge controller switch is closed such that the electrical load is isolated from the generator thereby inhibiting a large instantaneous load from being placed upon the generator and drive motor and maintaining the constant rotational speed of the drive motor.

11. The method according to claim 10, further comprising converting alternating current generated by the generator to direct current using a rectifier in electrical communication with the generator to store the direct current electrical energy in the plurality of batteries.

12. The method according to claim 11, further comprising converting the direct current received from the plurality of batteries to alternating current using an inverter.

13. The method according to claim 10, further comprising closing a battery bank bypass switch such that electrical energy generated by the generator bypasses the plurality of batteries and inhibits electrical energy from being transmitted to the plurality of batteries.

14. The method according to claim 10, further comprising converting a first portion of the direct current electrical energy transmitted from the plurality of batteries to alternating current using a first inverter.

15. The method according to claim 14, further comprising converting a second portion of the direct current electrical energy transmitted from the plurality of batteries to alternating current using a second inverter.

16. The method according to claim 15, wherein the first portion of direct current electrical energy is converted into alternating current using a pure sine wave inverter.

17. The method according to claim 16, wherein the second portion of direct current electrical energy is converted into alternating current using a grid tie inverter.

18. The method according to claim 10, further comprising monitoring the generator using a computer module in electrical communication therewith and generating an alarm in response to a fault identified by the computer module.

* * * * *